US012160659B2

(12) United States Patent
Cho et al.

(10) Patent No.: US 12,160,659 B2
(45) Date of Patent: Dec. 3, 2024

(54) MOBILE TERMINAL AND METHOD FOR CONTROLLING THE SAME

(71) Applicant: LG ELECTRONICS INC., Seoul (KR)

(72) Inventors: Mijin Cho, Seoul (KR); Hyerim Ku, Seoul (KR); Kyungrak Choi, Seoul (KR); Jieun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 9 days.

(21) Appl. No.: 18/023,889

(22) PCT Filed: Sep. 11, 2020

(86) PCT No.: PCT/KR2020/012305
§ 371 (c)(1),
(2) Date: Feb. 28, 2023

(87) PCT Pub. No.: WO2022/054991
PCT Pub. Date: Mar. 17, 2022

(65) Prior Publication Data
US 2023/0336863 A1   Oct. 19, 2023

(51) Int. Cl.
*H04N 23/63* (2023.01)
*H04M 1/02* (2006.01)
(Continued)

(52) U.S. Cl.
CPC .......... *H04N 23/632* (2023.01); *H04M 1/021* (2013.01); *H04M 1/724* (2021.01);
(Continued)

(58) Field of Classification Search
CPC .. H04N 23/632; H04N 5/2621; H04N 23/633; H04N 23/64; H04N 23/698;
(Continued)

(56) References Cited

U.S. PATENT DOCUMENTS

2012/0274808 A1   11/2012   Chong et al.
2021/0227195 A1*  7/2021   Holzer ................. G11B 27/031

FOREIGN PATENT DOCUMENTS

EP          1560421 A1 *   8/2005   ........... H04N 5/2252
EP          1763243 A2 *   3/2007   .......... H04M 1/0218
(Continued)

*Primary Examiner* — Ahmed A Berhan
(74) *Attorney, Agent, or Firm* — Birch, Stewart, Kolasch & Birch, LLP

(57) ABSTRACT

The present invention relates to a mobile terminal and a method for controlling same, and more particularly, provides a mobile terminal and a method for controlling same, the mobile terminal comprising: a body including a first body and a second body; a first camera and a second camera included in the body; displays coupled to the body and outputting images; and a control unit. The control unit outputs video previews to the display of the first body and outputs, to the display of the second body, a camera application for controlling the video previews that are being output, wherein the video previews include a first video preview captured by the first camera and a second video preview captured by the second camera.

20 Claims, 21 Drawing Sheets

(51) Int. Cl.
*H04M 1/724* (2021.01)
*H04N 5/262* (2006.01)
*H04N 23/60* (2023.01)
*H04N 23/698* (2023.01)

(52) U.S. Cl.
CPC ......... *H04N 5/2621* (2013.01); *H04N 23/633* (2023.01); *H04N 23/64* (2023.01); *H04N 23/698* (2023.01)

(58) Field of Classification Search
CPC .......... H04N 23/62; H04N 5/77; H04N 23/00; H04N 23/631; H04N 23/90; H04N 23/57; H04M 1/021; H04M 1/724; H04M 1/0264; H04M 1/0214; H04M 1/0225; H04M 1/0235; H04M 2250/52; H04M 1/72454; H04M 1/0268; H04M 1/72469; H04M 2201/38; G06F 3/0416; G06F 3/0481; G06F 3/0484; G06F 2203/04102
See application file for complete search history.

(56) References Cited

FOREIGN PATENT DOCUMENTS

| | | |
|---|---|---|
| JP | 2007-82223 A | 3/2007 |
| KR | 10-2014-0089866 A | 7/2014 |
| KR | 10-2014-0142542 A | 12/2014 |
| KR | 10-2015-0082788 A | 7/2015 |

* cited by examiner

FIG. 2
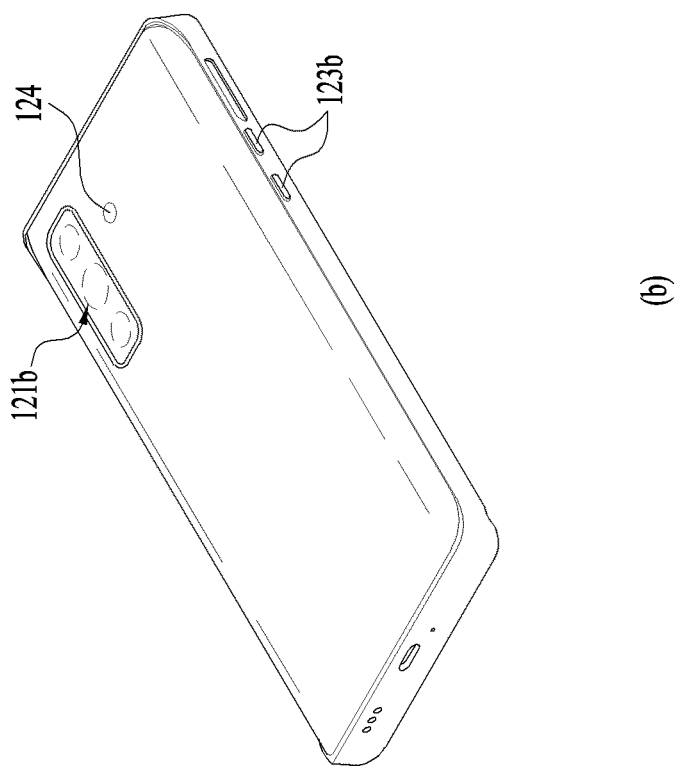
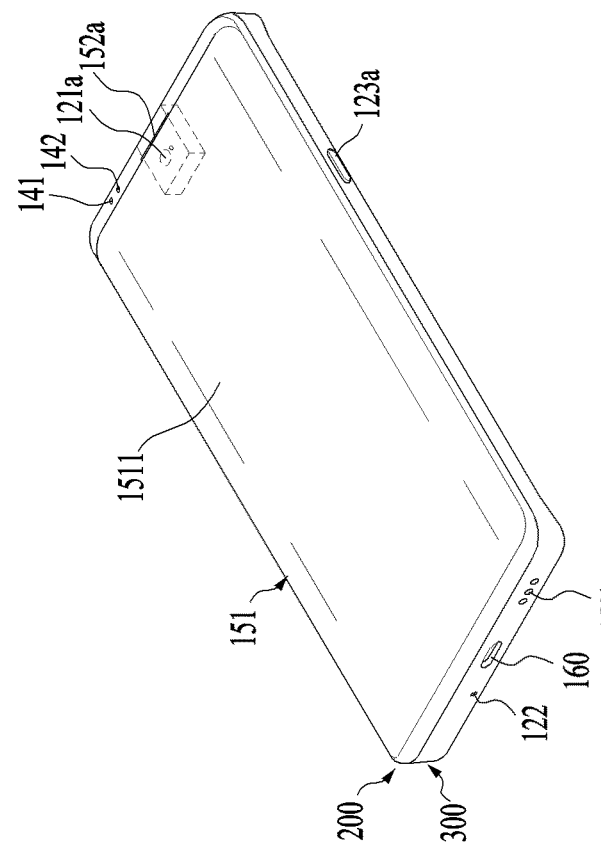

FIG. 3
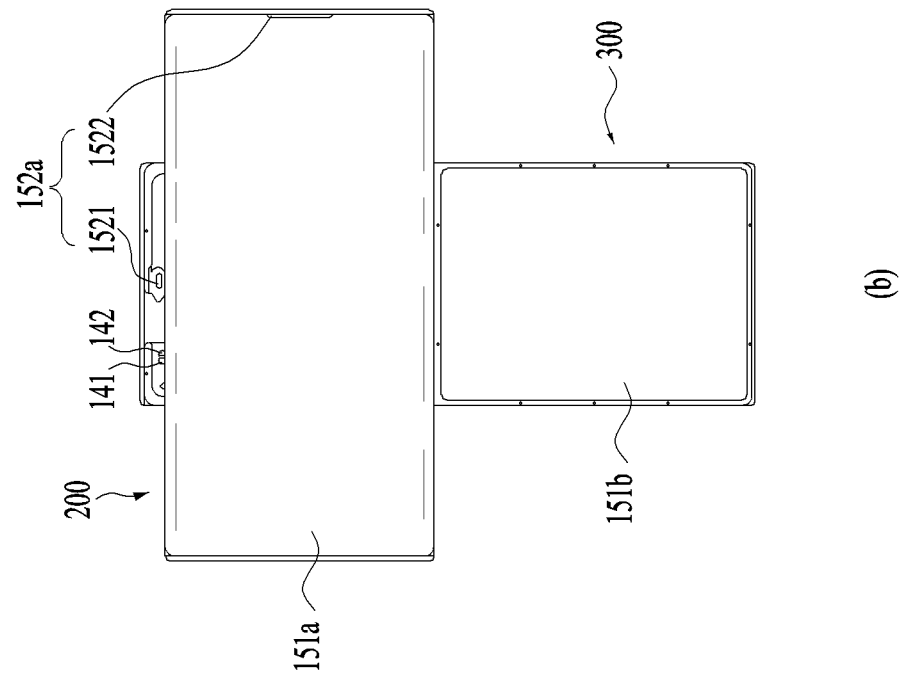
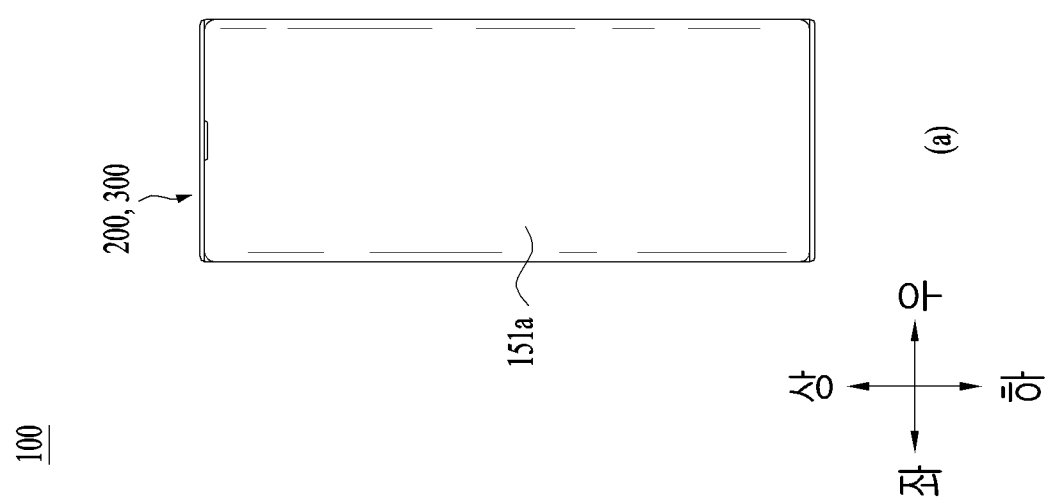

MOBILE TERMINAL AND METHOD FOR CONTROLLING THE SAME

CROSS REFERENCE TO RELATED APPLICATIONS

This application is the National Phase of PCT International Application No. PCT/KR2020/012305, filed on Sep. 11, 2020, all of which are hereby expressly incorporated by reference into the present application.

TECHNICAL FIELD

The present disclosure relates to a mobile terminal and a method for controlling the same. More specifically, the present disclosure relates to a mobile terminal that outputs a video preview and a camera application that controls the video preview, and a method for controlling the same.

BACKGROUND

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Mobile terminals may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players.

Efforts are ongoing to support and increase the functionality of mobile terminals. Such efforts include software and hardware improvements, as well as changes and improvements in the structural components.

Accordingly, recently developed terminals may have various form factors. However, UI/UX for applications utilizing a new type of form factor has not yet been developed.

In particular, it is known that there is a lack of embodiments on a method for applying a function of a camera application to the new type of form factor of the terminal.

SUMMARY

Technical Problem

The present disclosure is to solve the above and other problems.

The present disclosure is to provide a mobile terminal in which a video preview is output on a display of a first body, the video preview includes a first video preview filmed by a first camera and a second video preview filmed by a second camera, and a camera application that controls the video preview being displayed is displayed on a display of a second body, and a method for controlling the same.

Technical Solutions

According to an aspect of the present disclosure, a mobile terminal includes a body including a first body and a second body, a first camera and a second camera included in the body, a display coupled to the body so as to output an image, and a controller, the controller outputs a video preview on a display of the first body, the video preview includes a first video preview filmed by the first camera and a second video preview filmed by the second camera, and a camera application for controlling the video preview being output is output on a display of the second body.

According to an aspect of the present disclosure, the controller may output a save icon for the first video preview and the second video preview on the camera application, and the save icon may include a first save icon for separately saving a first video for the first video preview and a second video for the second video preview and a second save icon for saving the first video and the second video in a coupled manner.

According to an aspect of the present disclosure, when the first video and the second video are saved separately from each other, the controller may output a first frame roll for the first video and a second frame roll for the second video on the camera application, and the first frame roll may include a thumbnail for the first video and the second frame roll includes a thumbnail for the second video.

According to an aspect of the present disclosure, when the first video and the second video are saved in the coupled manner, the controller may output a third frame roll for the first video and the second video on the camera application, and the third frame roll may include thumbnails for the first video and the second video.

According to an aspect of the present disclosure, the controller may update the first frame roll with the first video preview newly filmed from a first time point when receiving a first signal to start recording in a state the first time point in the first frame roll is selected.

According to an aspect of the present disclosure, the controller may output the thumbnail for the first video and the thumbnail for the second video at a predetermined time interval.

According to an aspect of the present disclosure, the controller may output the thumbnail for the first video and the thumbnail for the second video based on a predetermined direction over time when outputting the first frame roll and the second frame roll.

According to an aspect of the present disclosure, the controller may output an editing guide pop-up window based on a second signal for selecting a pause icon output on the camera application.

According to an aspect of the present disclosure, the controller may output a thumbnail corresponding to a first time point in a pop-up window in response to a third signal for selecting the first time point in the first frame roll.

According to an aspect of the present disclosure, the controller may simultaneously record the first video preview and the second video preview in response to a fourth signal for recording the first video preview and the second video preview, and simultaneously pause the recording of the first video preview and the second video preview in response to a fifth signal for pausing the recording of the first video preview and the second video preview.

According to an aspect of the present disclosure, the controller may pause the recording of the first video preview and add a visual effect to the first video preview in response to a sixth signal for selecting the first frame roll in a state the first video preview is being recorded.

According to an aspect of the present disclosure, the controller may
output a switch icon on the camera application, and
change an output position of the first video preview and an output position of the second video preview in response to a seventh signal for selecting the switch icon.

According to an aspect of the present disclosure, the controller may output a ratio icon indicating an aspect ratio of the first video preview and the second video preview on the camera application.

According to an aspect of the present disclosure, the controller may output the first video preview and the second video preview at an aspect ratio of 1:1.

According to an aspect of the present disclosure, the controller may output the first video preview and the second video preview at an aspect ratio of 16:9, and the second video preview may be output in a scheme of an overlay of the first video preview and a size of the second video preview may be smaller than a size of the first video preview.

According to an aspect of the present disclosure, the first camera may be a front camera and the second camera may be a rear camera.

According to an aspect of the present disclosure, the first camera may be a rear wide-angle camera and the second camera may be a rear normal camera.

According to an aspect of the present disclosure, the first body may be a swivel body, the second body may be a main body, and the swivel body may be rotatable with respect to the main body.

According to an aspect of the present disclosure, the first body and the second body may be connected to each other via a hinge portion, and the first body and the second body may overlap each other when the mobile terminal is completely folded and the first body and the second body may constitute one flat surface when the mobile terminal is completely unfolded.

According to an aspect of the present disclosure, a method for controlling a mobile terminal including a body including a first body and a second body, a first camera and a second camera included in the body, and a display coupled to the body so as to output an image includes outputting a video preview on a display of the first body, wherein the video preview includes a first video preview filmed by the first camera and a second video preview filmed by the second camera, and outputting a camera application for controlling the video preview being output on a display of the second body.

Advantageous Effects

Effects of the mobile terminal and the method for controlling the same according to the present disclosure will be described below.

According to at least one of the embodiments of the present disclosure, there is the advantage in that the video previews respectively filmed by different cameras may be viewed at one time on one display.

According to at least one of the embodiments of the present disclosure, there is the advantage in that the video preview may be controlled by the camera application at the same time the video preview is filmed.

A further scope of applicability of the present disclosure will become apparent from the detailed description below.

However, because various changes and modifications within the spirit and scope of the present disclosure may be clearly understood by those skilled in the art, it should be understood that the detailed description and specific embodiments such as the preferred embodiment of the present disclosure are given as examples only.

BRIEF DESCRIPTION OF THE DRAWINGS

FIG. 2 is a conceptual diagram of a mobile terminal related to the present disclosure.

FIG. 3 is a diagram showing states before and after rotation of a swivel body of a mobile terminal related to the present disclosure.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
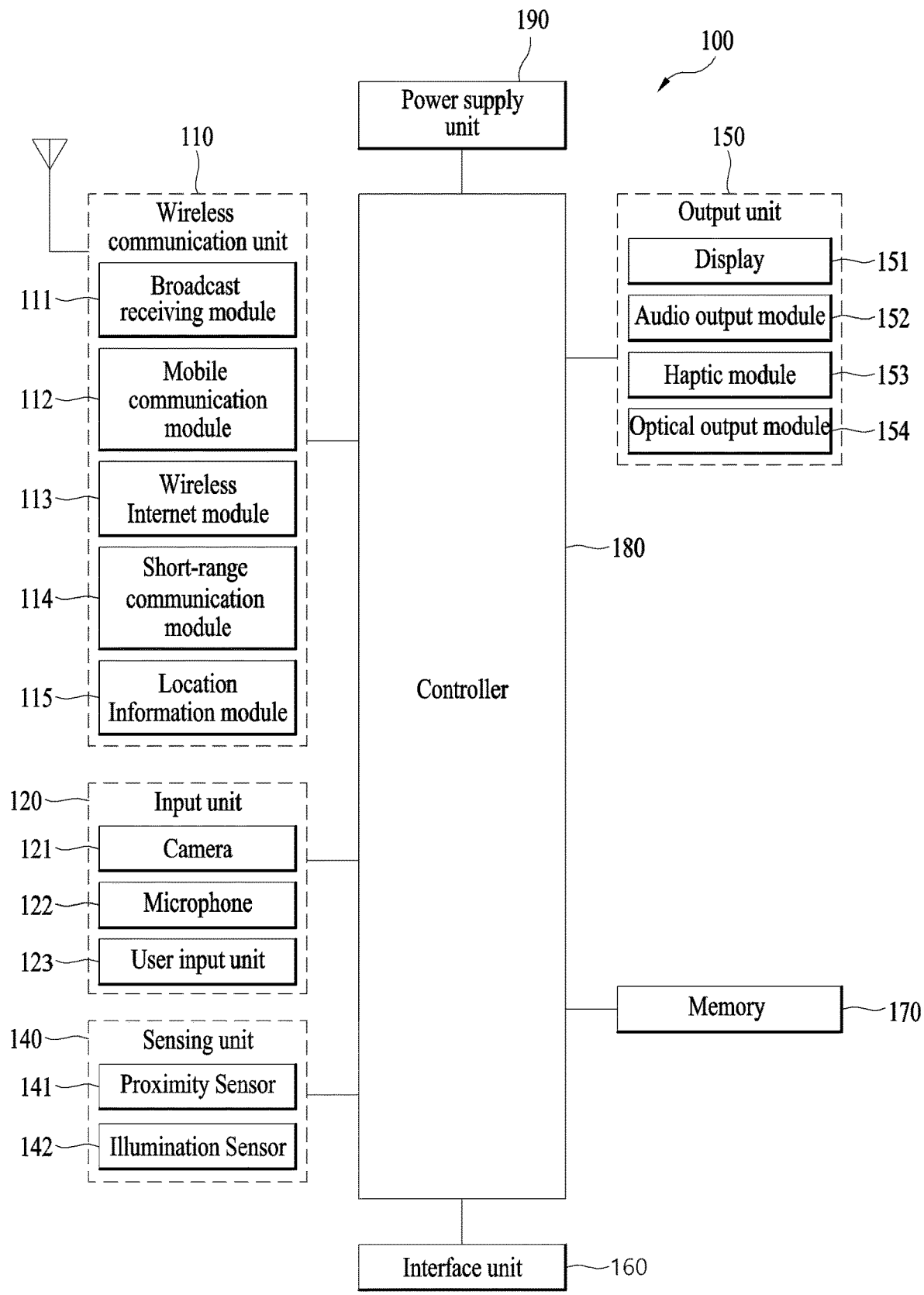
FIG. 1 is a block diagram for describing a mobile terminal.

FIG. 1 is a block diagram for describing a mobile terminal.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

----Swivel Terminal Standard Drawing----

(a) and (b) in FIG. 2 are conceptual diagrams of an example of the mobile terminal 100 related to the present disclosure viewed in different directions, and (a) and (b) in FIG. 3 show states before and after rotation of a swivel body 200 of the mobile terminal 100 related to the present disclosure.

The disclosed mobile terminal 100 has a rotatable terminal body. However, the present disclosure may be applied to various structures within a range that does not contradict the features described below.

Here, the terminal body may be understood as a concept referring to the mobile terminal 100 as an aggregate of at least one component.

The mobile terminal 100 may be composed of two bodies 200 and 300 that overlap each other. The two bodies 200 and 300 have displays 151a and 151b, respectively, and are rotatable relative to each other. The body disposed in the front is defined as the swivel body 200, and the body disposed in the rear is defined as the main body 300.

Each of the bodies 200 and 300 may include a front casing and a rear casing. Various electronic components are placed in an inner space defined by coupling of the front casing and the rear casing.

At least one middle casing may be additionally placed between the front casing and the rear casing.

The display unit 151 is disposed on a front surface of each of the bodies 200 and 300 to output information. As shown, a window 1511 of the display unit 151 may be mounted on the front casing to form a front surface of the terminal body together with the front casing.

The electronic components may also be mounted on the rear casing of the main body 300. The electronic components that may be mounted on the rear casing include a removable battery, an identification module, a memory card, and the like. In this case, a rear cover for covering the mounted electronic components may be detachably coupled to the rear casing. Therefore, when the rear cover is separated from the rear casing, the electronic components mounted on the rear casing are exposed to the outside.

When the rear cover is coupled to the rear casing, a portion of a side surface of the rear casing may be exposed. In some cases, the rear casing may be completely covered by the rear cover during the coupling. The rear cover may have an opening for exposing a camera 121b, the optical output module, a flash 124, a first manipulation unit 123a to the outside.

Such casings may be formed by injection molding of synthetic resin or may be made of metal, such as stainless steel (STS), aluminum (Al), or titanium (Ti).

Unlike the above example in which the plurality of casings define the internal space for accommodating the various electronic components therein, the mobile terminal 100 may be constructed such that one casing defines the internal space. In this case, a uni-body mobile terminal 100 in which synthetic resin or metal is connected from a side surface to a rear surface may be implemented.

The mobile terminal 100 may have waterproof portion (not shown) that prevents water from permeating into the terminal body. For example, the waterproof portion may include a waterproof member disposed between the window 1511 and the front casing, between the front casing and the rear casing, or between the rear casing and the rear cover to seal the internal space when the two components are coupled to each other.

The mobile terminal 100 may include the display unit 151, first and second audio output means 152a and 152b, the proximity sensor 141, the illumination sensor 142, the optical output module, first and second cameras 121a and 121b, first and second manipulation units 123a and 123b, the microphone 122, the interface unit 160, and the like.

The display unit 151 displays (outputs) information processed by the mobile terminal 100. For example, the display unit 151 may display execution screen information of an application program driven in the mobile terminal 100 or UI (User Interface) and GUI (Graphic User Interface) information based on such execution screen information.

The display unit 151 may include at least one of a liquid crystal display (LCD), a thin film transistor-liquid crystal display (TFT LCD), an organic light-emitting diode (OLED), a flexible display, a 3D display, and an e-ink display.

In addition, two or more display units 151 may exist depending on an implementation form of the mobile terminal 100. In this case, in the mobile terminal 100, a plurality of display units may be spaced apart from each other or integrally disposed on one surface, or may be respectively disposed on different surfaces.

The display unit 151 may include a touch sensor that senses a touch to the display unit 151, so that a control command may be received by a touch scheme. Using the scheme, when the touch is made on the display unit 151, the touch sensor may sense the touch, and the controller 180 may generate a control command corresponding to the touch based on such scheme. Contents input by the touch scheme may be letters or numbers, or menu items or the like that may be instructed or specified in various modes.

The touch sensor may be formed in a shape of a film having a touch pattern and disposed between the window 1511 and a display (not shown) on a rear surface of the window 1511, or may be a metal wire patterned directly on the rear surface of the window 1511. Alternatively, the touch sensor may be integrally formed with the display. For example, the touch sensor may be disposed on a substrate of the display or disposed inside the display.

As such, the display unit 151 may form a touch screen together with the touch sensor, and in this case, the touch screen may function as the user input unit 123 (see FIG. 1). In some cases, the touch screen may perform at least some functions of the manipulation units 123a and 123b instead of the same.

The first audio output means 152a may be implemented as a receiver that transmits a call sound to an ear of a user, and the second audio output means 152b may be implemented in a form of a loud speaker outputting various alarm sounds or reproduction sounds of multimedia.

A sound hole for sending sound generated from the first audio output means 152a may be defined in the window 1511 of the display unit 151. However, the present disclosure is not limited thereto. The sound may be emitted along an assembly gap between structures (e.g., a gap between the window 1511 and the front casing). In this case, an appearance of the mobile terminal 100 may be simpler because the hole defined independently for the sound output is not visible or hidden.

The optical output module is configured to output light for notifying when an event occurs. Examples of the event may include message reception, call signal reception, missed call, alarm, schedule notification, e-mail reception, information reception via an application, and the like. The controller 180 may control the optical output module such that the output of light is terminated when user's confirmation of the event is sensed.

The first camera 121a processes an image frame of a still image or a moving image obtained by an image sensor in a shooting mode or a video call mode. The processed image frame may be displayed on the display unit 151 and may be stored in the memory 170.

The manipulation units 123a and 123b are an example of the user input unit 123 manipulated to receive a command for controlling an operation of the mobile terminal 100, and may also be referred to as a manipulating portion. The manipulation units 123a and 123b may employ any tactile manner, such as touch, push, or scroll, in which the user receives a tactile feeling. In addition, the manipulation units 123a and 123b may be employed in a manner in which the manipulation is performed without the user's tactile feeling via a proximity touch, a hovering touch, or the like.

The manipulation units 123a and 123b may be the push keys (mechanical keys) or may be composed of a combination of the touch key and the push key. In addition, the manipulation units 123a and 123b may be formed in a layered form with a fingerprint sensor.

Contents input by the manipulation units 123a and 123b may be set in various ways. The manipulation units 123a and 123b may receive commands such as menu, home key, cancel, and search, or may receive commands such as adjustment of a volume of the sound output from the first or second audio output means 152a and 152b and switching of a mode of the display unit 151 to a touch recognition mode.

As another example of the user input unit 123, the first manipulation unit 123a may be disposed on the side surface of the terminal body. Such first manipulation unit 123a is manipulated to receive the command for controlling the operation of the mobile terminal 100. The input content may be set in various ways. For example, commands such as power ON/OFF, start, end, scroll, and the like, the adjustment of the volume of the sound output from the first and second audio output means 152a and 152b, the switching of the mode of the display unit 151 to the touch recognition mode, and the like may be received. The first manipulation unit 123a may be implemented in a form enabling input by a touch input, a push input, or a combination thereof.

The mobile terminal 100 may include the fingerprint recognition sensor for recognizing a user's fingerprint and the controller 180 may use fingerprint information sensed via the fingerprint recognition sensor as authentication means. The fingerprint recognition sensor may be built into the display unit 151 or the user input unit 123.

The microphone 122 receives a user's voice, other sounds, and the like. The microphone 122 may be disposed at a plurality of locations to receive stereo sound.

The interface unit 160 becomes a passage through which the mobile terminal 100 may be connected to an external device. For example, the interface unit 160 may be at least one of a connection terminal (e.g., an earphones and an external speaker) for connection with other devices, a port (e.g., an infrared port (IrDA Port), a Bluetooth port, a wireless LAN port, and the like) for short-range communication, or a power supply terminal for supplying power to the mobile terminal 100. Such interface unit 160 may be implemented in a form of a socket for accommodating an external card such as a subscriber identification module (SIM) or a user identity module (UIM) and a memory card for storing information.

A second camera 121b may be disposed on the rear surface of the terminal body. In this case, a shooting direction of the second camera 121b is substantially opposite to that of the first camera 121a.

The second camera 121b may include a plurality of lenses arranged along at least one line. The plurality of lenses may be arranged in a matrix form. Such a camera may be referred to as an 'array camera'. When the second camera 121b is constructed as the array camera, images may be filmed in various ways using the plurality of lenses, and better quality images may be obtained.

The flash 124 may be disposed adjacent to the second camera 121b. The flash 124 shines light toward a subject when the subject is filmed by the second camera 121b.

The second audio output means 152b may be additionally disposed on the terminal body. The second audio output means 152b may implement a stereo function together with the first audio output means 152a, and may be used to implement a speakerphone mode during the call.

The terminal body may include at least one antenna for wireless communication. The antenna may be embedded in the terminal body or may be formed in the casing. For example, the antenna forming a portion of the broadcast receiving module 111 (see FIG. 1) may be constructed to be withdrawn from the terminal body. Alternatively, the antenna may be formed in a film type and attached to an inner surface of the rear cover, or the casing containing a conductive material may function as the antenna.

The terminal body includes the power supply unit 190 (see FIG. 1) for supplying power to the mobile terminal 100.

The power supply unit 190 may include a battery built into the terminal body or disposed on an outer side of the terminal body so as to be detachable.

The battery may receive the power via a power cable connected to the interface unit 160. In addition, the battery may be wirelessly charged via a wireless charging device. The wireless charging may be implemented by a magnetic induction scheme or a resonance scheme (a magnetic resonance scheme).

In this drawing, the rear cover is coupled to the rear casing so as to cover the battery to limit escape of the battery and to protect the battery from external impacts and foreign substances. When the battery is detachable from the terminal body, the rear cover may be detachably coupled to the rear casing.

Based on a front surface of the mobile terminal 100, the swivel body 200 and the main body 300 may have shapes corresponding to each other. In particular, the swivel body 200 and the main body 300 may have a bar-shaped appearance as a whole and a rectangular shape based on a front surface thereof. In this case, the rectangle means a substantial rectangle. A direction parallel to a long side of the rectangle is defined as a length direction of each of the bodies 200 and 300, and a direction parallel to a short side is defined as a width direction of each of the bodies 200 and 300.

The swivel body 200 is rotatable with respect to the main body 300. The rotation of the swivel body 200 is made with one axis in a thickness direction (a front and rear direction) of the mobile terminal 100 as a rotation axis while maintaining a parallel state with the main body 300.

Based on the front surface, a state in which the rectangular swivel body 200 is rotated to be directed in the same direction as the main body 300 so as to cover the main body 300 is defined as a 'closed state', and a state in which the rectangular swivel body 200 is rotated to be perpendicular to the main body 300 is defined as an 'open state'.

A rotation angle of the swivel body 200 between the closed state and the open state may be 90°.

In the case of the embodiment, the open state indicates a state in which the swivel body 200 rotates clockwise based on the closed state, but may also indicate a state in which the swivel body 200 rotates counterclockwise.

The first screen 151*a* of the swivel body 200 is exposed to the front in both closed and open states, whereas the second screen 151*b* of the main body 300 is exposed to the front only in the open state. In a process of changing from the closed state to the open state, an exposed area of the second screen 151*b* may gradually increase and may be maximum in the open state.

The first audio output means 152*a*, which is constructed as the receiver for transmitting the call sound to the user's ear, is preferably disposed at the same position (i.e., a position corresponding to the user's ear) in both the closed and open states of the mobile terminal 100. To this end, the first audio output means 152*a* may include a first receiver hole 1521 and a second receiver hole 1522. Waves of sound may be generated from a speaker module at a point on a rear surface of the first receiver hole 1521 among electrical parts of the mobile terminal 100, output sequentially via the first receiver hole 1521 and the second receiver hole 1522 in the closed state of the swivel body 200, and output only via the first receiver hole 1521 in the open state of the swivel body 200.

The second receiver hole 1522 may be defined in a form of a slit or a fine perforated hole such that the sound waves output via the first receiver hole 1521 may pass therethrough without being blocked when the swivel body 200 is closed.

In order to perform the same function even when the swivel body 200 is open, the proximity sensor 141 and the illumination sensor 142 may also be disposed in the main body 300.

The first camera 121*a* may be disposed on the swivel body 200 and always exposed on the front surface of the mobile terminal 100, but may be formed in a pop-up camera that is selectively exposed only when being driven as shown in FIG. 2. The first camera 121*a*, which is formed in the form of the pop-up camera, may be disposed on the main body 300, which has a relatively large space, so that efficient arrangement may be implemented.

----Rollable Terminal Standard Drawing----

Figure 4:
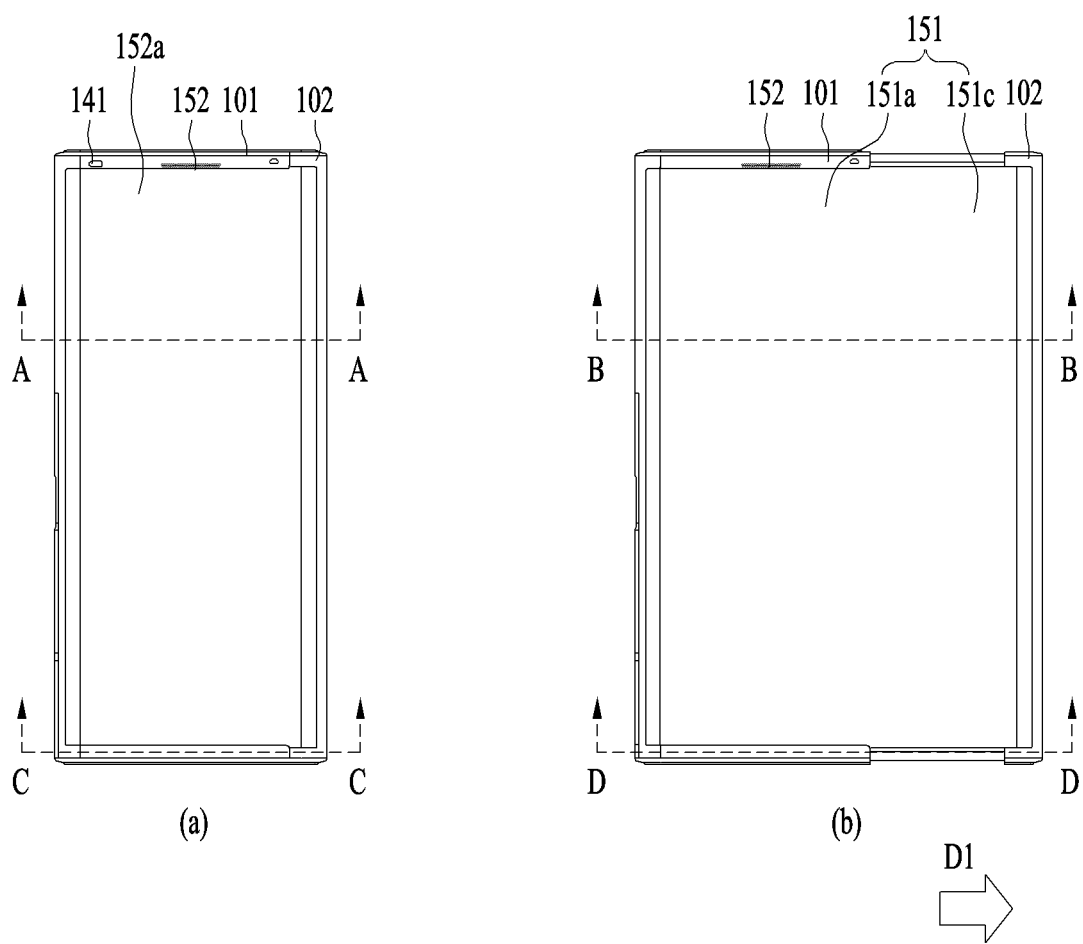
FIG. 4 shows front views of a first state and a second state according to an embodiment of a mobile terminal related to the present disclosure.
Figure 5:
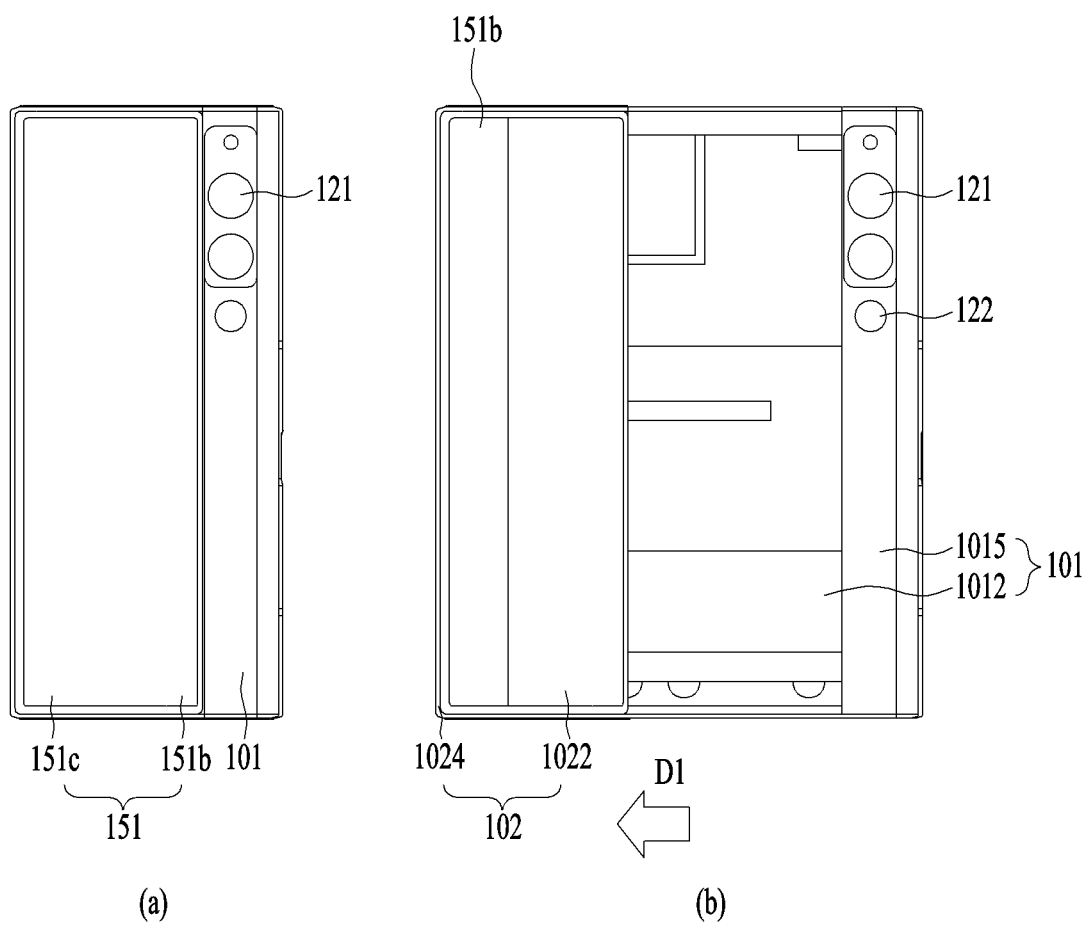
FIG. 5 shows rear views of a first state and a second state according to an embodiment of a mobile terminal related to the present disclosure.

FIG. 4 shows front views of a first state and a second state according to one embodiment of a mobile terminal, and FIG. 5 shows rear views of a first state and a second state according to one embodiment of a mobile terminal. (a) in FIG. 4 and (a) in FIG. 5 are diagrams showing the first state in which the mobile terminal is reduced, and (b) in FIG. 4 and (b) in FIG. 5 are diagrams showing the second state in which the mobile terminal is enlarged.

As shown, the mobile terminal 100 in the first state is in the reduced state and has a smaller size than the mobile terminal 100 in the second state. In addition, a size of the display 151 located on the front surface of the mobile terminal 100 is smaller than that in the second state. The mobile terminal 100 in the first state may be extended in a first direction D1 to be in the second state. In the second state, as shown in (b) in FIG. 4, the size of the mobile terminal 100 and a size of the display unit 151 located on the front surface are larger than those in the first state, and, as shown in (b) in FIG. 5, a size of the display unit 151 located on the rear surface is reduced. That is, a portion of the display unit 151 located on the rear surface of the mobile terminal 151 in the first state move to the front surface of the mobile terminal 100 in the second state. In addition, the mobile terminal 100 may operate in an extended display mode as the second frame expands and operate in a reduced display mode as the second frame contracts. In this regard, the extended display mode may correspond to the aforementioned first state, and the reduced display mode may correspond to the second state.

In the following description, a direction in which the mobile terminal 100 and the display 151 thereof are extended (or enlarged) is called the first direction D1, a direction in which the mobile terminal 100 and the display 151 thereof are contacted (or retracted) or reduced to switch the state thereof from the second state to the first state is called a second direction D2, and a direction perpendicular to the first and second directions D1 and D2 is called a third direction. The description will be made based on the first and second directions being horizontal directions and the third direction being a vertical direction, but depending on the arrangement of the mobile terminal 100, the first and second directions may be vertical directions and the third direction may be a horizontal direction.

The display 151 may be coupled to the body such that a display area visible from the front surface of the body may vary as the mode of the display 151 is switched between the extended display mode and the reduced display mode. That is, the display 151 may cover the front surface, the side surface, and the rear surface of the body. In this regard, the display 151 may be implemented as the flexible display unit 151 in FIG. 1. In one embodiment of the present disclosure, as the second frame expands, a display portion located on the side surface of the body may move to the front surface of the body, and the display portion located on the rear surface of the body may move to the front surface via the side surface of the body. In addition, as the second frame is contracted, the display portion located on the front surface of the body may move to the side surface of the body or move to the rear surface via the side surface of the body.

As such, the flexible display unit 151 that is bent such that the position of the display unit may be changed may be used as the display unit. The flexible display unit 151 is a display unit that may maintain a flat state like a conventional flat panel display and may be curved, bent, folded, twisted, or curled like paper. The flexible display unit refers to a durable display that is manufactured on a thin and flexible substrate and is light and does not break easily. The flexible display unit may be bent in a specific direction like the paper, and the flexible display unit according to the present disclosure may be disposed such that a curvature may change in the first direction.

In addition, an electronic paper, as a display technology to which general ink characteristics are applied, may be different from the conventional flat panel display in that it uses reflected light. The electronic paper may change information using a twist ball or electrophoresis using a capsule.

In a state in which the flexible display unit 151 is not deformed (e.g., a state of having an infinite radius of curvature, hereinafter, referred to as a basic state), the display area of the flexible display unit 151 becomes a flat surface. In a state of deformed by an external force from the basic state (e.g., a state of having a finite radius of curvature, hereinafter, referred to as a deformed state), the display area may become a curved surface. As shown, information displayed in the deformed state may be visual information output on the curved surface. Such visual information is implemented by independently controlling light emission of unit pixels (sub-pixels) arranged in a matrix form. The unit pixel means a minimum unit for implementing one color. When the external force is applied to the flexible display unit 151, the flexible display unit 151 may be deformed from the basic flat state to a bent state rather than a flat state.

The flexible display unit 151 may implement a flexible touch screen in combination with the touch sensor. When the touch is made on a flexible touch screen, the controller 180 (see FIG. 1) may perform control corresponding to such touch input. The flexible touch screen may be configured to sense the touch input not only in the basic state but also in the deformed state.

The touch sensor senses the touch (or the touch input) applied to the touch screen using at least one of various touch schemes such as a resistive scheme, a capacitance scheme, an infrared scheme, an ultrasonic scheme, and a magnetic field scheme.

As an example, the touch sensor may be configured to convert a change in a pressure applied to a specific portion of the touch screen or in a capacitance occurred in a specific portion or the like into an electrical input signal. The touch sensor may be configured to sense a position, an area, a pressure upon the touch, a capacitance upon the touch, and the like of the touch made onto the touch sensor by a touch subject who performs the touch onto the touch screen.

The mobile terminal 100 may have deformation sensing means capable of sensing the deformation of the flexible display unit 151. Such deformation sensing means may be included in the sensing unit 140 (see FIG. 1).

The deformation sensing means may be disposed in the flexible display unit 151 or the casing (first frame and the second frames 101 and 102 to be described later) to sense information related to the deformation of the flexible display unit 151. In this regard, the information related to the deformation may include a direction in which the flexible display unit 151 is deformed, a degree of deformation, a deformed position, a deformed time, an acceleration at which the deformed flexible display unit 151 is restored, and the like, and may include various types of information that may be sensed because of the bending of the flexible display unit 151.

In addition, the controller 180 may change information displayed on the flexible display unit 151 or generate a control signal for controlling a function of the mobile terminal 100 based on the information related to the deformation of the flexible display unit 151 sensed by the deformation sensing means.

In addition, the deformation of the flexible display unit 151 may vary based on positions of the first frame 101 and the second frame 102. As shown in FIG. 4, because the bent position of the flexible display unit 151 is determined based on the positions of the first frame and the second frame, the bending deformation position of the flexible display unit 151 and the area thereof located on the front surface may be calculated based on the positions of the first frame 101 and the second frame 102 instead of the deformation sensing means of the flexible display unit 151.

The state switching (the first or second state) of the flexible display unit 151, that is, the size change at the front surface and the rear surface of the mobile terminal 100 of the display unit 151 based on the size change of the mobile terminal 100 may be performed manually by a force applied by the user, but not be limited to such passive scheme. For example, when the mobile terminal 100 or the flexible display unit 151 is in the first state, the deformation may be made into the second state by a command of the user or the application without the external force applied by the user. In order for the flexible display 151 to be automatically deformed without the external force, the mobile terminal 100 may include driving means.

The flexible display unit 151 according to the present disclosure is bent 180 degrees while being rolled in a state surrounding a side portion in the first direction of the mobile terminal 100. Therefore, based on the side portion of the mobile terminal 100, a portion of the flexible display unit 151 is disposed on the front surface of the mobile terminal 100 and another portion of the flexible display unit 151 is disposed on the rear surface of the mobile terminal 100. For convenience of description, the portion of the flexible display unit 151 positioned on the front surface is referred to as a front portion, and the portion of the flexible display unit 151 positioned on the rear surface is referred to as a rear portion. As shown in FIG. 4, the mobile terminal may be expanded in the first direction or contracted in the second direction opposite to the first direction, and in this case, an area of the flexible display unit 151 located on the front surface changes. That is, sizes of the front and rear portions may vary based on the state change of the mobile terminal.

The portion of the flexible display unit 151 located on the front surface of the mobile terminal 100 may be fixed to the front surface of the first frame 101 so as not to move, and the another portion thereof located on the rear surface of the mobile terminal 100 may be movable on the rear surface.

In addition, the flexible display unit 151 may be wound or unwound at the side portion in the first direction of the mobile terminal. Accordingly, the size of the area of the flexible display unit 151 disposed on the front surface of the mobile terminal 100 may be adjusted by moving the portion of the flexible display unit 151 disposed on the rear surface of the mobile terminal 100. Because an area size of the flexible display unit 151 is fixed and is formed as of one continuous body, when an area size of the front portion increases, an area size of the rear portion decreases. Such a display unit 151 may be wound inside the second frame 102, precisely on a side portion in the first direction of the second frame 102, which is movable relative to the first frame 101 to be described later, and may be withdrawn or pulled out from the second frame 102 or insert or pushed thereinto while being wound around the second frame 102 based on a moving direction of the second frame 102 so as to adjust the area of the display unit 151 on the front surface of the mobile terminal 100. Such operation will be described later in more detail along with other relevant components of the mobile terminal 100.

Normally, the antenna is disposed in the casing or a housing of the mobile terminal 100, but a portion where the antenna is installed in the casing or the housing may be limited by the flexible display unit 151 that covers the rear surface as well as the front surface of the mobile terminal 100. For this reason, the antenna may be implemented on the flexible display unit 151. An antenna on display (AOD) is an antenna in which a patterned electrode layer and a dielectric layer are layered to form a transparent film. The antenna on display has an advantage of not being exposed to the outside without affecting a thickness as it may be implemented with a smaller thickness compared to a laser direct structuring (LDS) technology implemented with an existing copper nickel plating scheme. In addition, the antenna on display may directly transmit and receive signals to and from the display unit 151. Therefore, in the mobile terminal 100 in which the display unit 151 is located on both surfaces, as described in the present disclosure, the antenna on display may be used.

----Foldable Terminal Standard Drawing----

Figure 6:
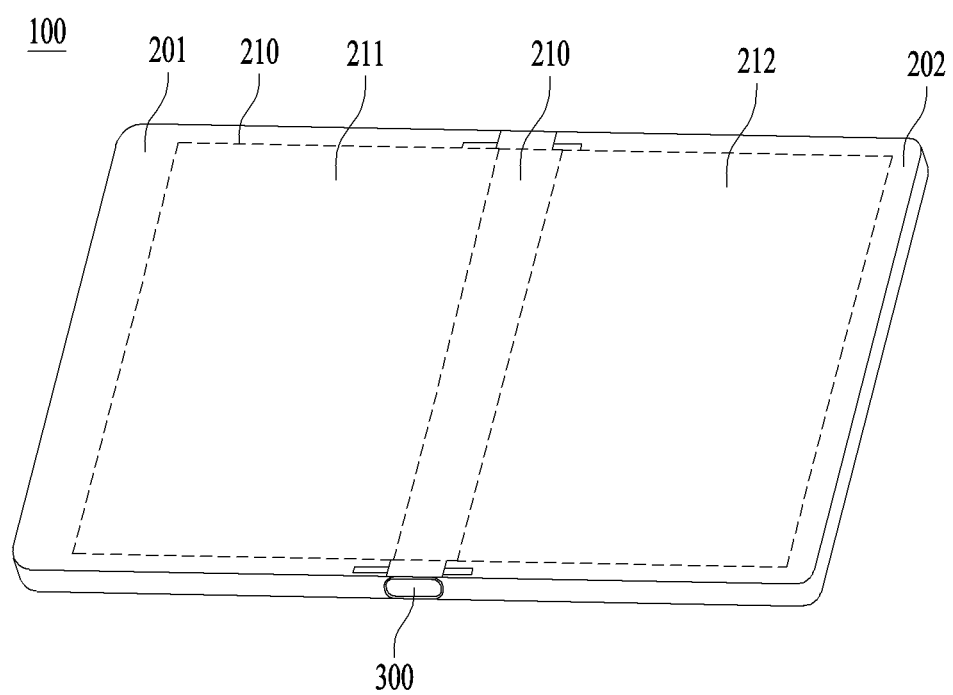
FIG. 6 is a view of a foldable mobile terminal related to the present disclosure viewed in one direction in an unfolded state.

FIG. 6 shows a perspective view of the foldable mobile terminal 100 viewed in one direction in an unfolded state according to one embodiment of the present disclosure. Here, the foldable mobile terminal 100 according to the present disclosure is one type of the mobile terminal 100 in FIG. 1 and may include a corresponding component.

The present disclosure relates to the foldable mobile terminal 100 including a display unit 210 on a pair of bodies 201 and 202 that are folded around a hinge portion 301.

The pair of bodies 201 and 202 according to the present disclosure include a first body 201 and a second body 202 connected to each other via the hinge portion 301. In the mobile terminal 100 according to the present disclosure, the first body 201 and the second body 202 may overlap each other in a completely folded state, and the first body 201 and the second body 202 may constitute one plane in a fully unfolded state.

The display unit 210 according to the present disclosure may output visual information and may be folded together with the pair of bodies 201 and 202 that are folded on the flexible display. The display unit 201 may be disposed on one surfaces of the pair of bodies 201 and 202. Specifically, the display unit 201 may include a first area 211 supported by the first body 201, a second area 212 supported by the second body 202, and a third area 213 corresponding to the hinge portion 301. In this regard, the third area 213 may be disposed between the first area 201 and the second area 202 and may be folded and unfolded in response to the folding mechanism of the first body 201 and the second body 202.

Figure 7:
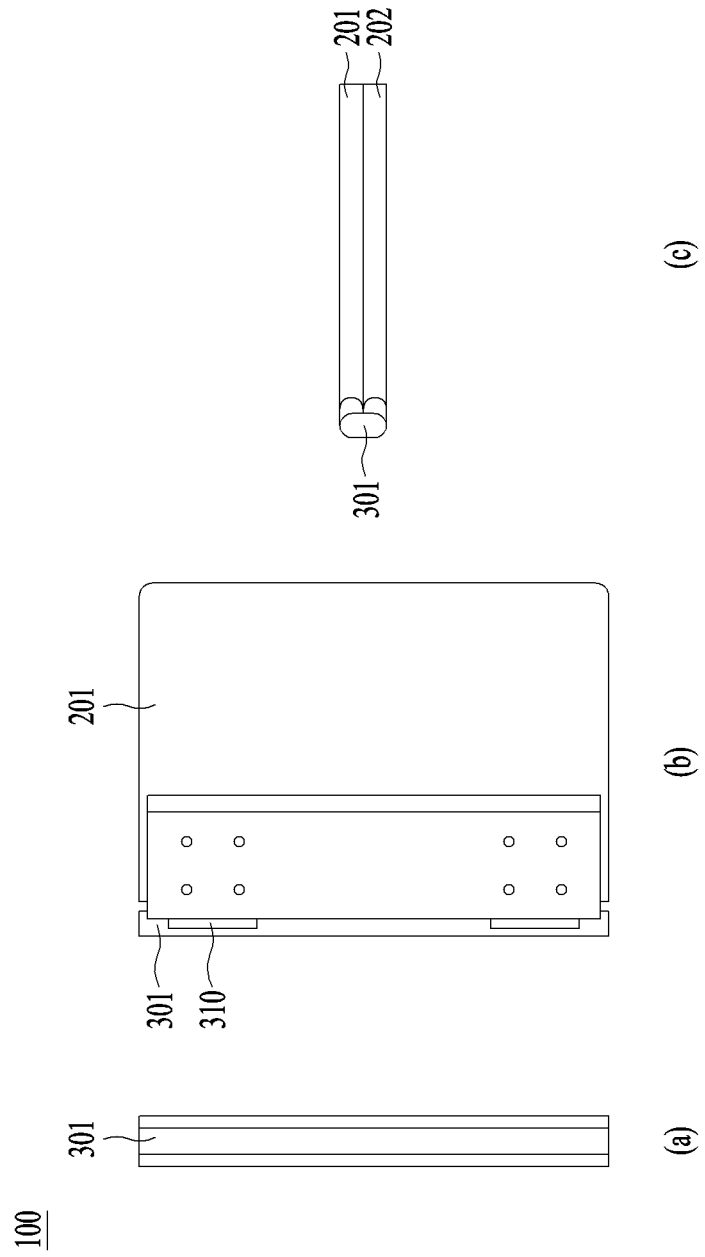
FIG. 7 shows a diagram of a foldable mobile terminal in a folded state according to an embodiment of the present disclosure.

FIG. 7 shows a diagram of a foldable mobile terminal in a folded state according to an embodiment of the present disclosure. Specifically, (a) in FIG. 7 is a side view of the foldable mobile terminal 100 having the hinge portion 301 in the folded state. (b) in FIG. 7 is a front view of the foldable mobile terminal 100 in the folded state. (c) in FIG. 7 is a view of a lower side surface of the foldable mobile terminal 100 in the folded state.

The mobile terminal 100 according to the present disclosure may be folded in an in-folding scheme or an out-folding scheme. The in-folding scheme and the out-folding scheme may be distinguished from each other by a direction in which the pair of bodies 201 and 202 are folded.

The in-folding scheme is a scheme in which the pair of bodies 201 and 202 are folded in a direction where the display unit 201 (see FIG. 6) is located, and FIG. 7 illustrates the in-folding scheme. In the in-folding scheme, the display unit 201 may not be exposed to the outside in the folded state and may be exposed to the outside in the unfolded state.

The out-folding scheme is a scheme in which the pair of bodies 201 and 202 are folded in a direction opposite to the direction in which the display unit 201 is located. In the out-folding scheme, the pair of bodies 201 and 202 may be exposed to the outside both in the folded state and the unfolded state. The present disclosure is an invention characterized by sensing a folding angle and obtaining external information corresponding to the folding angle, and is able to be applied to the out-folding scheme in addition to the in-folding scheme.

Hereinafter, embodiments related to a control method that may be implemented in the mobile terminal constructed as described above will be described with reference to the accompanying drawings. It is apparent to those skilled in the art that the present disclosure may be embodied in other specific forms within a range that does not deviate from the spirit and essential characteristics of the present disclosure.

Figure 8:
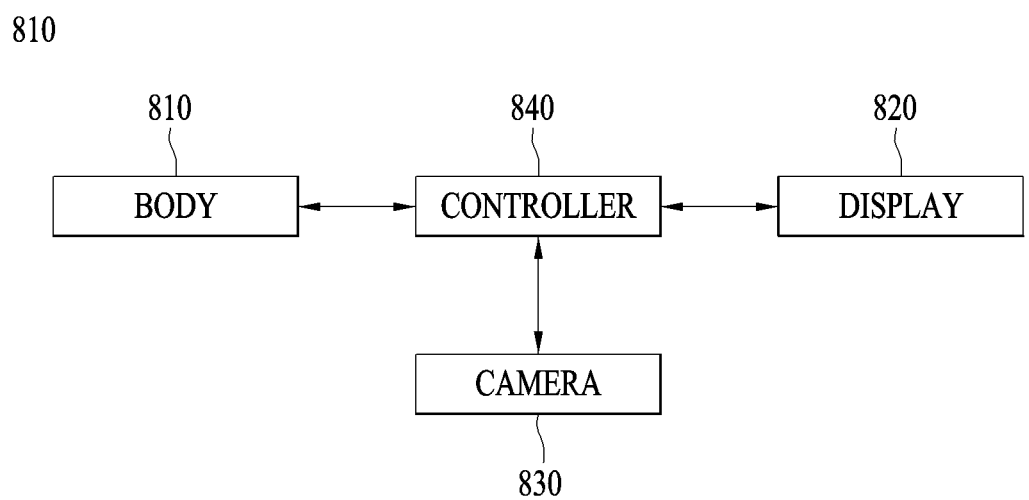
FIG. 8 is a block diagram illustrating modules constituting a mobile terminal according to an embodiment of the present disclosure.

FIG. 8 is a block diagram illustrating modules constituting a mobile terminal according to an embodiment of the present disclosure. The block diagram in FIG. 8 is to better illustrate the embodiment of the present disclosure. A mobile terminal to be described below may be implemented as the mobile terminals shown in FIGS. 1 to 7.

Referring to FIG. 8, the mobile terminal 100 according to one embodiment of the present disclosure may include a body 810, a display 820, a camera 830, and a controller 840.

The body 810 is hardware constituting the mobile terminal 100, and is able to be implemented as the hardware shown in FIGS. 1 to 7 described above. In one embodiment of the present disclosure, the body may include a first body and a second body. In particular, the body 810 may be composed of the swivel body and the main body to drive the swivel mobile terminal, may include the first frame and the second frame to drive the rollable mobile terminal, or may include the first body and the second body connected to each other via the hinge portion to drive the foldable mobile terminal.

However, the swivel mobile terminal, the rollable mobile terminal, and the foldable mobile terminal are only examples of hardware for applying the embodiment of the present disclosure, and the present disclosure is not limited thereto.

The display 820 may display the visual information. In this regard, the visual information may include text, indicators, icons, content, applications, images, videos, and the like. In addition, the display 920 may output the visual information on the screen based on a control command of the controller 940.

In one embodiment of the present disclosure, the display 820 outputs a camera application and various icons included in the camera application.

In addition, the display 820 may be implemented as the touch screen by forming the layered structure or integrally formed with the touch sensor as described above in FIG. 1, but an output function and a touch function may be individually controlled. This will be described in detail in the drawings below.

The camera 830 may be included in the body 810 and may process the image frame of the video or the like obtained by the image sensor, and the controller 840 may output the image frame obtained via the camera 830 on the display 820 or store the image frame in memory (not shown). In addition, the camera 830 may be implemented as the camera 121 in FIG. 1, and a position of the camera 830 in the terminals in FIGS. 2 to 7 may be changed.

In particular, the camera 830 may include a first camera and a second camera, and the first camera may be a front camera and the second camera may be a rear camera. In this regard, the first camera may be implemented as the first camera 121*a* in FIG. 2, and the second camera may be implemented as the second camera 121*b*.

In addition, in a following embodiment, it is assumed that the first camera is the front camera and the second camera is the rear camera, but the first camera may be a rear wide-angle camera and the second camera may be the rear camera. In other words, two types of rear cameras may be embedded in the rear surface of the body, apart from the front camera embedded in the front surface of the body of the terminal, and in one embodiment of the present disclosure, the first camera may correspond to the rear wide-angle camera and the second camera may correspond to a rear normal camera.

The controller 840 may process data, control each unit of the aforementioned mobile terminal 900, and control data transmission/reception between the units. In the present disclosure, the controller 840 may be implemented as the controller 180 in FIG. 1.

Operations performed by the mobile terminal 100 may be controlled by the controller 840. However, for convenience, in the drawings and a following description, such operations are collectively referred to as being performed/controlled by the mobile terminal 100.

Hereinafter, embodiments of the present disclosure will be described with reference to FIGS. 9 to 17. In describing and understanding the embodiments of the present disclosure below, reference may be made to the above-described contents with respect to FIGS. 1 to 8.

Figure 9:
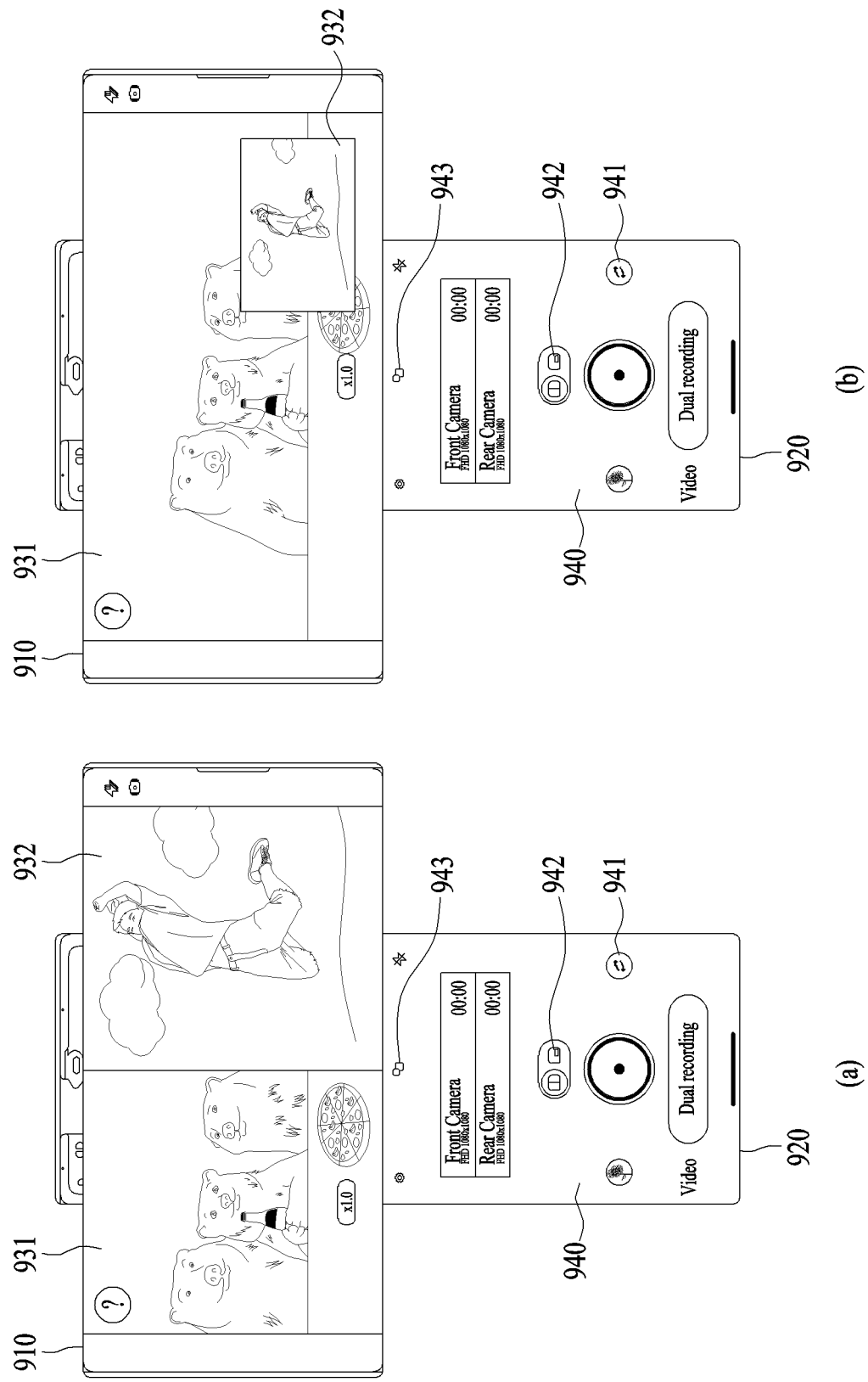
FIG. 9 is a diagram illustrating an embodiment of outputting a video preview and an application in a mobile terminal related to the present disclosure.

FIG. 9 is a diagram illustrating an embodiment of outputting a video preview and an application in a mobile terminal related to the present disclosure.

(a) in FIG. 9 is characterized in that an aspect ratio of a first video preview and a second video preview is 1:1, and (b) in FIG. 9 is characterized in that the aspect ratio of the first video preview and the second video preview is 16:9. In this regard, the aspect ratio of 1:1 or 16:9 is an example, and the embodiment of the present disclosure is not limited thereto.

In one embodiment of the present disclosure, the mobile terminal may output a video preview on a display of a first body 910, the video preview may include a first video preview 931 that is a preview image filmed by the first camera and a second video preview 932 that is a preview image filmed by the second camera, and a camera application 940 that controls the video preview being displayed may be output on a display of the second body.

More specifically, referring to (a) in FIG. 9, the mobile terminal may output the first video preview 931 filmed by the first camera and the second video preview 932 taken from the second camera on the display of the first body 910 at the aspect ratio of 1:1. Accordingly, the user may simultaneously use the first video preview 931 and the second video preview 932 at the aspect ratio of 1:1.

In addition, the mobile terminal may output the camera application 940 that controls the first video preview 931 and the second video preview 932 on the display of the second body 920.

In this regard, because the first video preview 931 and the second video preview 932 are able to be filmed at the same time, the mobile terminal may display various icons that control the respective video previews via the camera application.

In one embodiment of the present disclosure, the mobile terminal may output a switch icon 941 on the camera application 940. The mobile terminal may change an output position of the first video preview 931 and an output position of the second video preview 932 based on a signal of selecting the switch icon 941. For example, the user may change the output positions of the first video preview 931 and the second video preview 932 by touching the switch icon 941.

In addition, in one embodiment of the present disclosure, the mobile terminal may output a ratio icon 942 on the camera application 940. Here, the ratio icon 942 may indicate the aspect ratio of the first video preview 931 and the second video preview 932. In this regard, the ratio icon 942 may include an icon indicating at least one aspect ratio.

More specifically, the mobile terminal may output a ratio icon indicating the aspect ratio of 1:1 and a ratio icon indicating the aspect ratio of 16:9.

When the mobile terminal receives a signal for selecting the ratio icon indicating the aspect ratio of 1:1, the aspect ratio of the first video preview 931 and the second video preview 932 may be output as 1:1 as shown in (a) in FIG. 9. Similarly, when the mobile terminal receives a signal for selecting the ratio icon indicating the aspect ratio of 16:9, the aspect ratio of the first video preview 931 and the second video preview 932 may be output as 16:9 as shown in (b) in FIG. 9.

In one embodiment of the present disclosure, the mobile terminal may output a save icon 943 for the first video preview 931 and the second video preview 932 on the camera application 940. In this regard, the save icon 943 may indicate a save scheme for the first video preview 931 and the second video preview 932. The save icon 943 may include a first save icon for separately saving a first video for the first video preview 931 and a second video for the second video preview 932, and a second save icon for saving the first video and the second video in a coupled manner.

In this regard, the user may select the first save icon or the second save icon by touching the save icon 943. Accordingly, based on the user's selection, the mobile terminal may separately save the first video and the second video when the first save icon is selected, and save the first video and the second video in the coupled manner when the second save icon is selected. This will be described in detail in the following drawings.

In addition, referring to (b) in FIG. 9, the mobile terminal may display the first video preview 931 filmed by the first camera and the second video preview 932 filmed by the second camera on the display of the first body 910 with the aspect ratio of 16:9.

In one embodiment of the present disclosure, when the first video preview 931 and the second video preview 932 of the first body 910 are output with the aspect ratio of 16:9, the mobile terminal may output the second video preview 932 in an overlay scheme of the first video preview 931. In this regard, a size of the second video preview 932 may be smaller than that of the first video preview 931.

Therefore, the user may simultaneously use the first video preview 931 and the second video preview 932 with the aspect ratio of 16:9. In addition, similar to (a) in FIG. 9, the mobile terminal may change the output positions of the first video preview 931 and the second video preview 932 based on a signal for selecting the switch icon 941.

In addition, although not shown in the drawing, the mobile terminal may change the output position of the second video preview 932 based on a signal for selecting and dragging the second video preview 932. That is, the second video preview 932 may operate similarly to a pop-up window.

Figure 10:
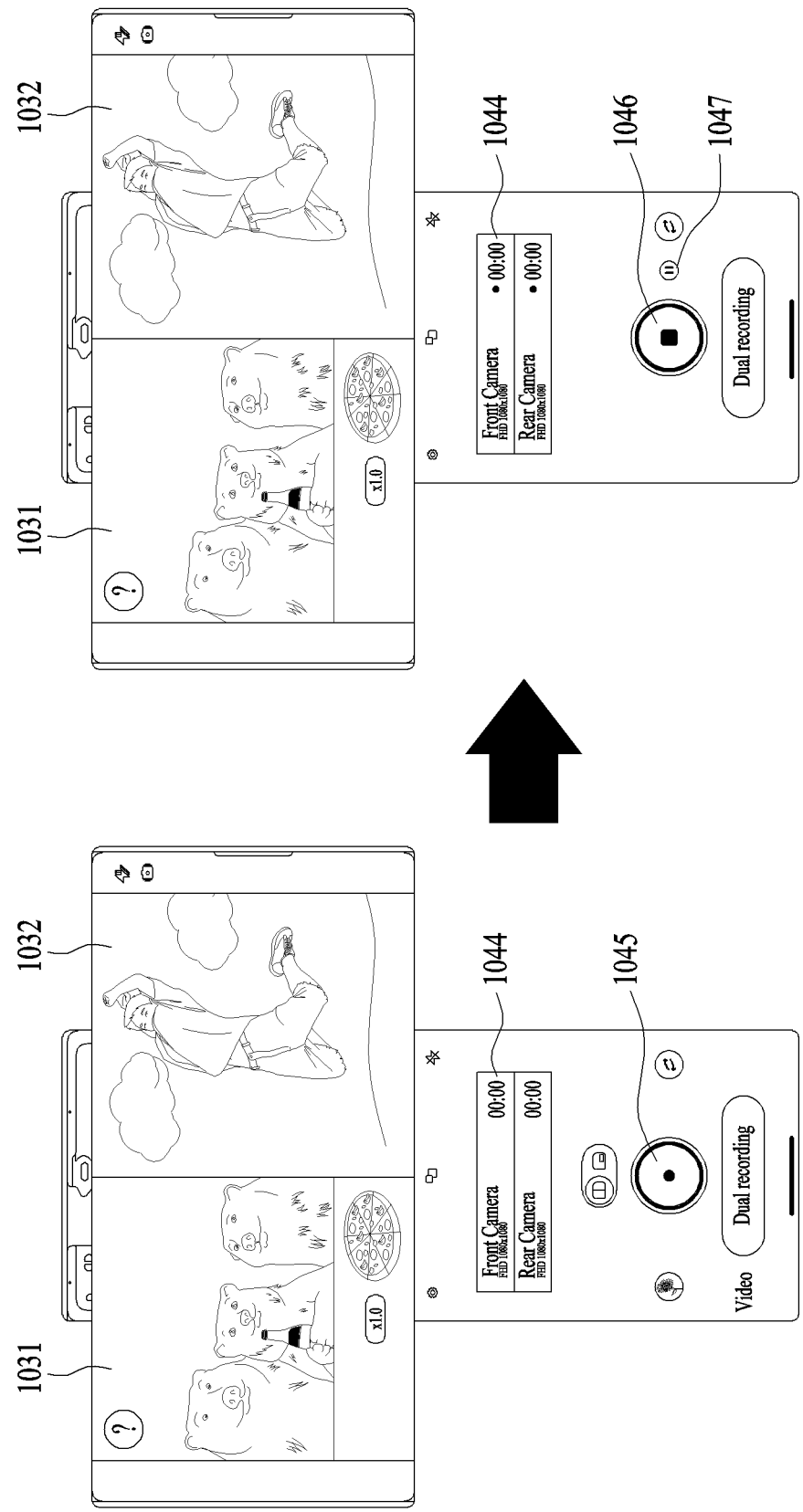
FIG. 10 is a diagram for illustrating an embodiment of filming a video preview in a mobile terminal related to the present disclosure.

FIG. 10 is a diagram for illustrating an embodiment of filming a video preview in a mobile terminal related to the present disclosure. Hereinafter, a description duplicated with that in FIG. 9 will be omitted.

Referring to a left drawing in FIG. 10, the mobile terminal may output a recording icon 1044 on a camera application 1040.

In one embodiment of the present disclosure, the mobile terminal may simultaneously record a first video preview 1031 and a second video preview 1032 based on a signal for selecting the recording icon 1044.

In addition, the mobile terminal may output a state icon 1044 indicating recording states of the first video preview 1031 and the second video preview 1032. More specifically, because the left drawing in FIG. 10 represents a state before the recording, the state icon 1044 may indicate states before the recording of the first video preview 1031 and the second video preview 1032.

For example, the state icon 1044 may include text indicating that the first video preview 1031 is filmed via the front camera and is currently recorded for "00:00 minutes". In addition, the state icon 1044 may include text indicating that the second video preview 1032 is filmed via the rear camera and is currently recorded for "00:00 minutes".

In addition, although not shown in the drawing, the state icon 1044 may include text indicating that the first video preview 1031 is taken via the rear wide-angle camera and the second video preview 1032 is taken via the rear normal camera.

Referring to a right drawing of FIG. 10, in the state in which the first video preview 1031 is being filmed via the first camera and the second video preview 1032 is being filmed via the second camera, the mobile terminal may simultaneously record the first video preview 1031 and the second video preview 1032 based on a signal for selecting a recording icon 1045.

In one embodiment of the present disclosure, the mobile terminal may change the state icon 1044 as the first video preview 1031 and the second video preview 1032 are recorded. In this regard, the state icon 1044 may include indication (e.g., a red dot) indicating that the recording is currently being performed and text indicating a current recording duration (e.g., 00:30 minutes).

In addition, the mobile terminal may change the recording icon 1045 into a stop icon 1046 as the first video preview 1031 and the second video preview 1032 are recorded, and may output a pause icon 1047.

In this regard, the mobile terminal may simultaneously pause the recording of the first video preview 1031 and the second video preview 1032 based on a signal for selecting the pause icon 1047.

Figure 11:
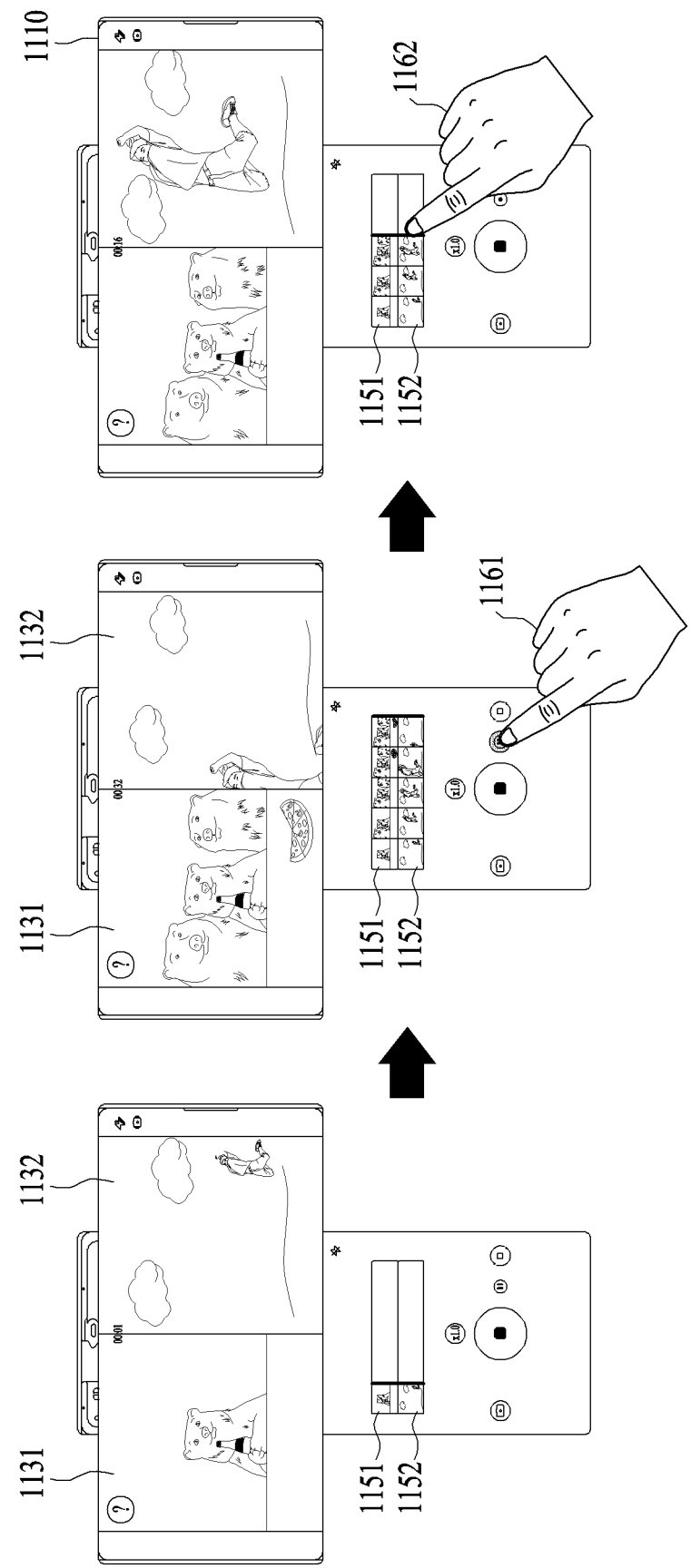
FIG. 11 is a diagram illustrating an embodiment of outputting a frame roll for a video preview in a mobile terminal related to the present disclosure.

FIG. 11 is a diagram illustrating an embodiment of outputting a frame roll for a video preview in a mobile terminal related to the present disclosure. It may be assumed that the embodiment in FIG. 11 is in the state in which a first video preview and a second video preview are being recorded and are separately saved as described above.

Referring to a first drawing of FIG. 11, the mobile terminal may record a first video preview 1131 and a second video preview 1132. In this regard, it may be referred to that a content output in the first video preview 1131 becomes a first video when being recorded, and a content output in the second video preview 1132 becomes a second video when being recorded.

In one embodiment of the present disclosure, the mobile terminal may output a first frame roll 1151 for the first video and a second frame roll 1152 for the second video.

Referring to a second drawing of FIG. 11, the first frame roll 1151 may include thumbnails for the first video preview 1131, and the second frame roll 1152 may include thumbnails for the second video preview 1132.

More specifically, the mobile terminal may output the thumbnails of the first video preview 1131 and second video preview 1132 respectively in the first frame roll 1151 and the second frame roll 1152 at a predetermined interval while the first video and the second video are being recorded.

For example, the mobile terminal may add one thumbnail of each of the first video preview 1131 and the second video preview 1132 to each of the first frame roll 1151 and the second frame roll 1152 at an interval of 1 second.

In one embodiment of the present disclosure, when outputting the first frame roll 1151 and the second frame roll 1152, the mobile terminal may output the thumbnails for the first video preview 1131 and the thumbnails for the second video preview 1132 in a predetermined direction over time. For example, the mobile terminal may add the thumbnails one by one from left to right at the interval of one second.

In addition, the mobile terminal may output new thumbnails at a right side while expressing the thumbnails in the first frame roll 1151 and the second frame roll 1152 to pass naturally to the left as time passes.

In one embodiment of the present disclosure, the mobile terminal may receive a first signal 1161 for selecting the pause icon while recording the first video and the second video.

Referring to a third drawing of FIG. 11, the mobile terminal may pause filming of the first video preview 1131 and the second video preview 1132 that are being recorded in response to the first signal 1161.

In one embodiment of the present disclosure, when the recording of the first video and the second video is stopped, the mobile terminal may output a thumbnail corresponding to a first point on the display of the swivel body 1110 in response to a second signal 1162 for selecting the first point inside the first frame roll 1151 or the second frame roll 1152. That is, the mobile terminal may output a thumbnail of the first video corresponding to the first point and a thumbnail of the second video corresponding to the first point on the display of the swivel body 1110.

Figure 12:
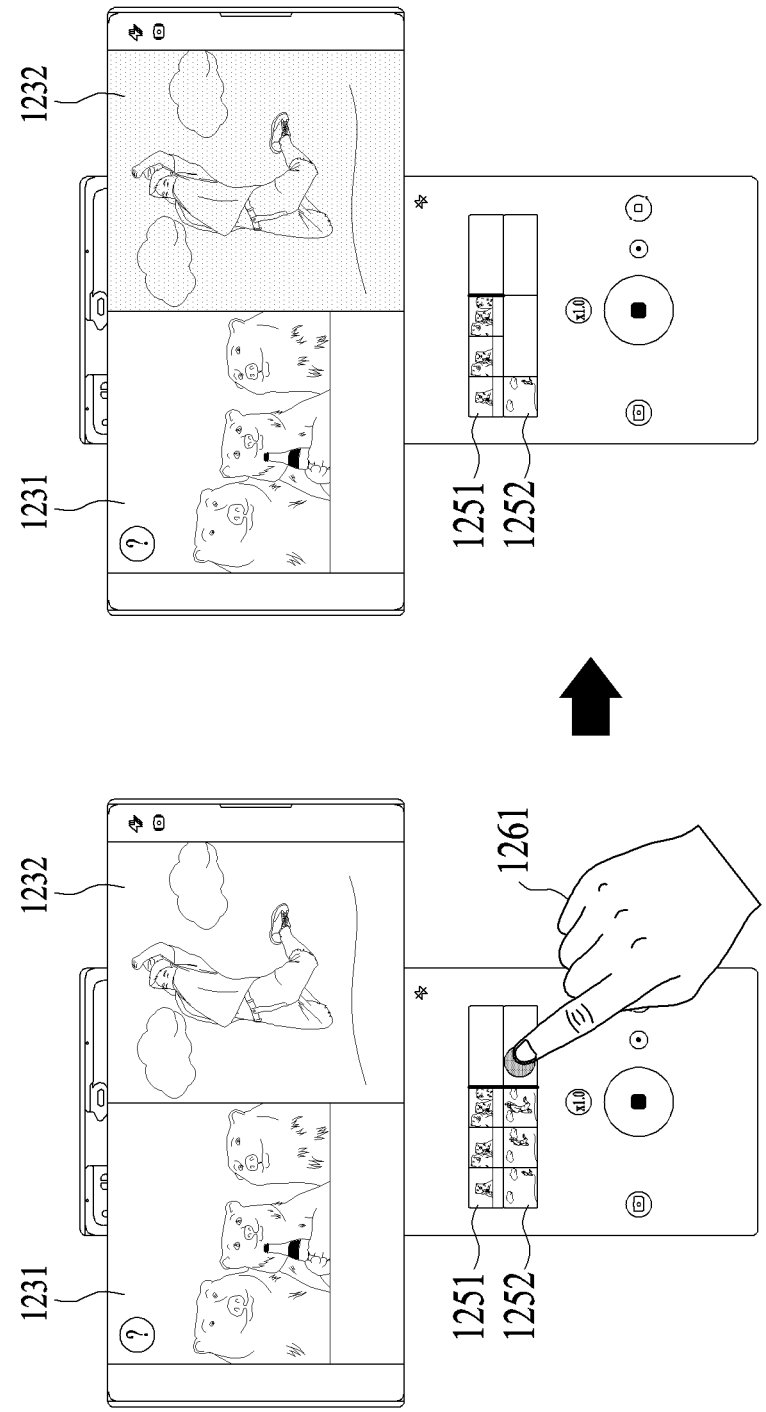
FIG. 12 is a diagram for illustrating an embodiment of pausing during video recording in a mobile terminal related to the present disclosure.

FIG. 12 is a diagram for illustrating an embodiment of pausing during video recording in a mobile terminal related to the present disclosure.

The embodiment of simultaneously recording and simultaneously pausing the first video preview and the second video preview been described in FIG. 11, but an embodiment of recording or pausing one video preview will be described in FIG. 12.

Referring to a first drawing of FIG. 12, the mobile terminal may record a first video and a second video while filming a first video preview 1231 and a second video preview 1232.

In this regard, as described above, the mobile terminal may output a first frame roll 1251 for the first video and a second frame roll 1252 for the second video.

In one embodiment of the present disclosure, the mobile terminal may receive a first signal 1261 for selecting the second frame roll 1252. For example, the user may touch the second frame roll 1252 while recording the first video and the second video.

Referring to a second drawing of FIG. 12, the mobile terminal may stop the recording of the second video preview 1232 based on the first signal 1261. In addition, the mobile terminal may stop outputting thumbnails in the second frame roll 1252 as the recording of the second video preview 1232 is stopped.

In one embodiment of the present disclosure, the mobile terminal may add a visual effect to the second video preview 1232 as the recording of the second video preview 1232 is stopped. For example, the mobile terminal may dim or display in black and white the second video preview 1232.

That is, based on the first signal 1261, the mobile terminal may continue to record the first video preview 1231 and continue to add thumbnails to the first frame roll 1251, but the mobile terminal may dim the second video preview 1232 and not add the thumbnails to the second frame roll 1252.

In addition, although not shown in the drawing, the mobile terminal may re-record the second video preview 1232, which was paused, in response to a second signal (not shown) for selecting the second frame roll 1252 once more. Similarly, the mobile terminal may remove the visual effect added to the second video preview 1232 in response to the second signal.

Hereinafter, the camera application output from the main body will be described in detail with reference to FIGS. 13A to 16B. accordingly, it is assumed in FIGS. 13A to 16B that a video preview filmed by a camera is output from the swivel body although the drawing of the swivel body is omitted.

Figure 13A:
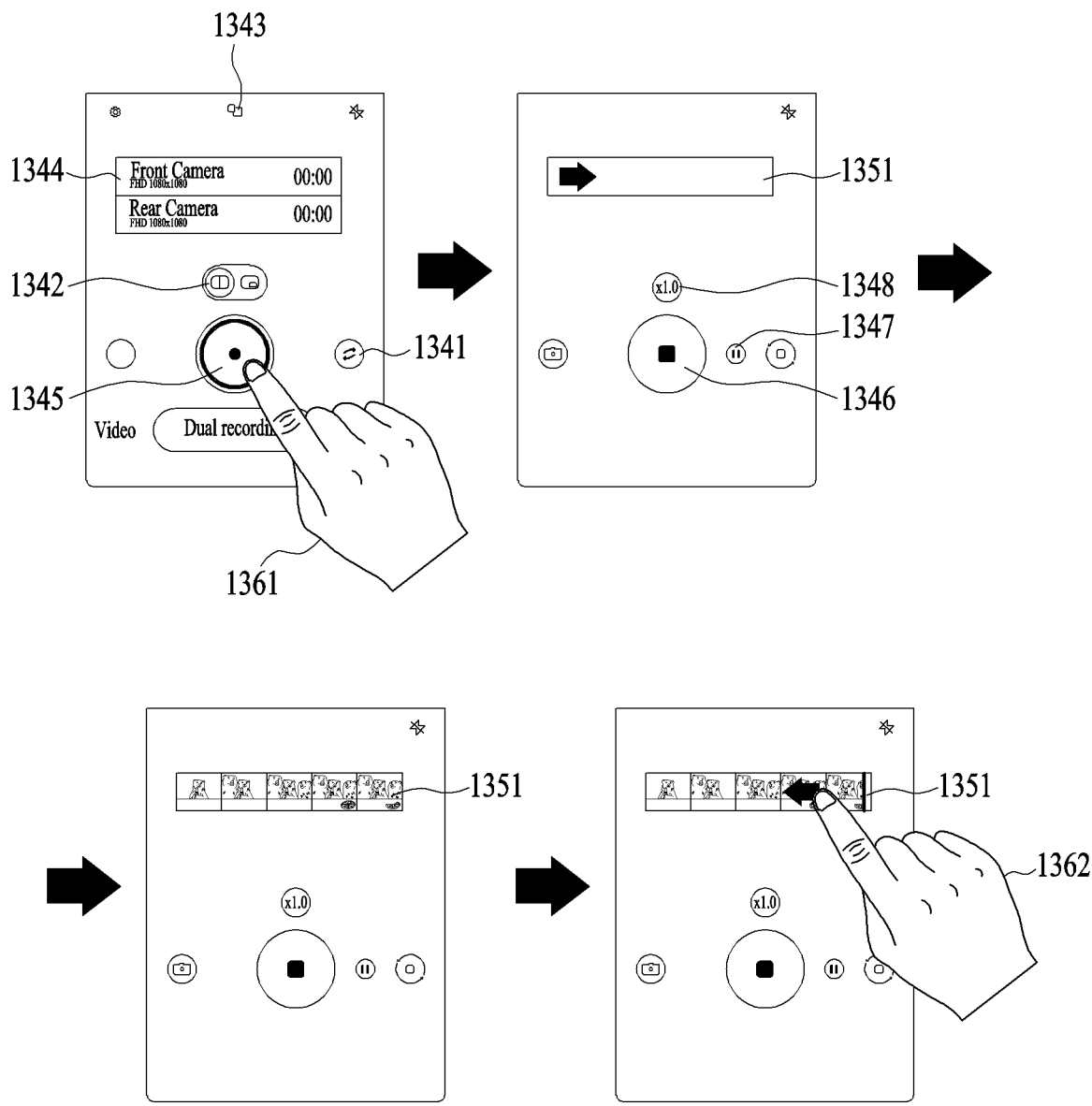
FIG. 13A is a diagram for illustrating an embodiment of saving a first video and a second video in a coupled manner in a mobile terminal related to the present disclosure.

FIG. 13A is a diagram for illustrating an embodiment of saving a first video and a second video in a coupled manner in a mobile terminal related to the present disclosure.

Referring to a first drawing of FIG. 13A, in a state before recording a first video preview and a second video preview, the mobile terminal may output a switch icon 1341, a ratio icon 1342, a save icon 1343, a state icon 1344, and a recording icon 1345 on the camera application output from the main body. For this, refer to the above-described embodiment. In this regard, in the embodiment in FIG. 13A, the save icon 1343 may indicate an icon for saving the videos in the coupled manner.

The mobile terminal may record the first video preview and the second video preview based on a first signal 1361 of selecting the recording icon 1345.

Referring to second and third drawings of FIG. 13A, the mobile terminal may change icons output on the camera application while recording the first video preview and the second video preview.

More specifically, because the mobile terminal saves the first video preview and the second video preview in the coupled manner, the mobile terminal may output a first frame roll 1351 that combines the first video for the first video preview and the second video for the second video preview to each other. In this regard, the first frame roll 1351 may include a thumbnail for the first video preview and a thumbnail for the second video preview.

In addition, as described above, the mobile terminal may add and output the thumbnails for the first video and the second video in the first frame roll 1351 from left to right as the time passes.

In addition, as the first video preview and the second video preview are recorded, the mobile terminal may change the recording icon 1345 to a stop icon 1346 and output a pause icon 1347 and a zoom icon 1348.

Referring to a fourth drawing of FIG. 13A, the mobile terminal may output, via the display of the swivel body, a thumbnail for a selected time point based on a second signal 1362 of dragging the thumbnails included in the first frame roll 1351 in left and right directions.

In addition, the mobile terminal may update the recording with a new video preview from the time point selected based on the second signal 1362. This will be described in detail with reference to FIGS. 16A and 16B.

Figure 13B:
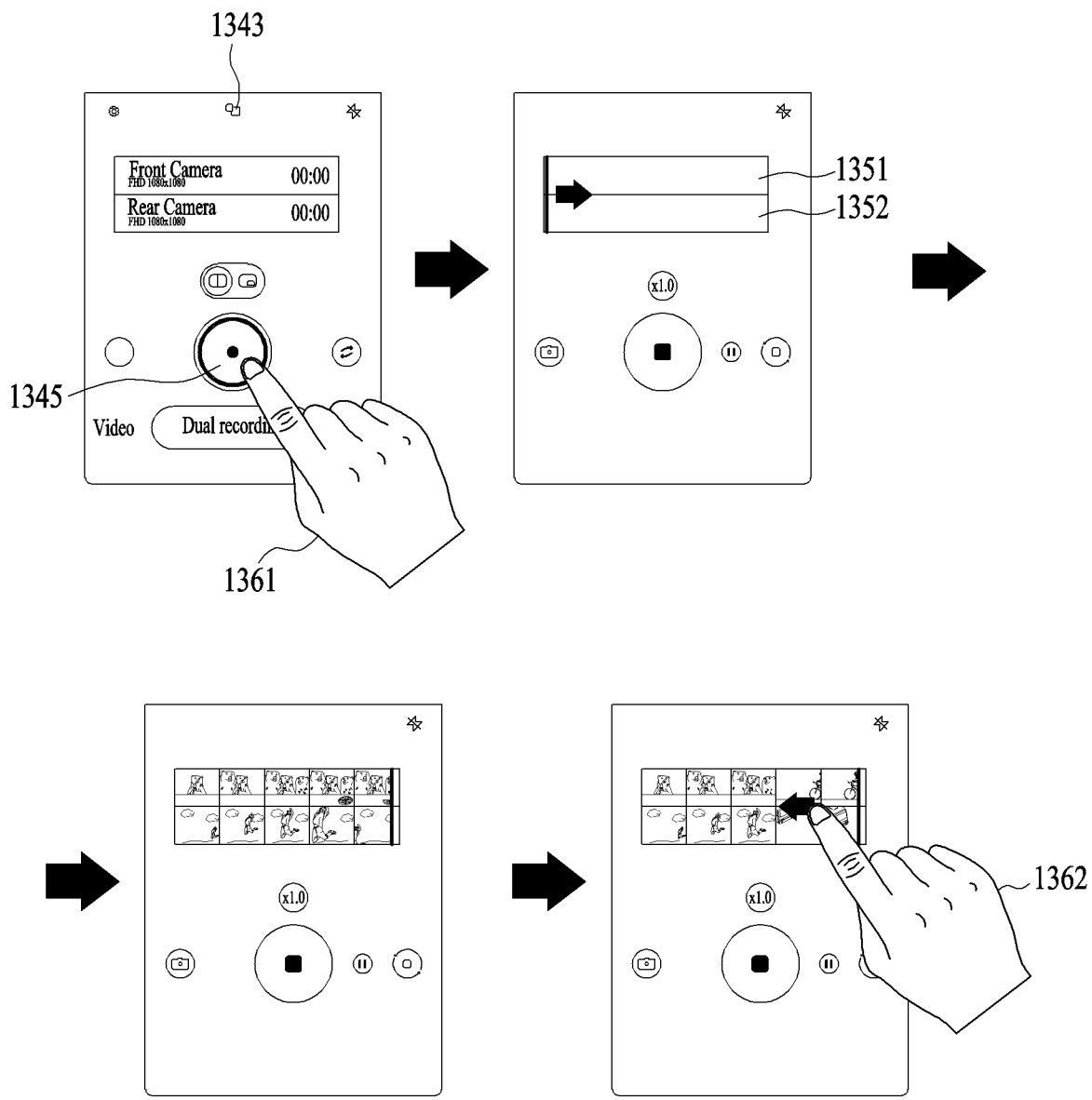
FIG. 13B is a diagram for illustrating an embodiment of separately saving a first video and a second video in a mobile terminal related to the present disclosure.

FIG. 13B is a diagram for illustrating an embodiment of separately saving a first video and a second video in a mobile terminal related to the present disclosure. Hereinafter, description duplicated with that of FIG. 13A will be omitted.

A first drawing of FIG. 13B corresponds to the first view of FIG. 13A. However, unlike in the embodiment of FIG. 13A, the save icon 1343 may indicate an icon for saving the video previews in the separate manner in the embodiment of FIG. 13B.

In one embodiment of the present disclosure, the mobile terminal may record the first video preview and the second video preview based on the first signal 1361 for selecting the recording icon.

Referring to second and third drawings of FIG. 13B, because the mobile terminal separately saves the first video preview and the second video preview, the first frame roll 1351 for the first video preview and the second frame roll 1352 for the second video preview may be output independently of each other.

Accordingly, as the first video preview and the second video preview are recorded, the mobile terminal may add thumbnails respectively corresponding to the first video preview and the second video preview to the first frame roll 1351 and the second frame roll 1352, respectively.

Referring to a fourth drawing of FIG. 13B, the mobile terminal may output, on the display of the swivel body, thumbnails for the selected time point based on a second signal 1362 of dragging the thumbnails included in the first frame roll 1351 and the second frame roll 1352 in the left and right directions.

Figure 14A:
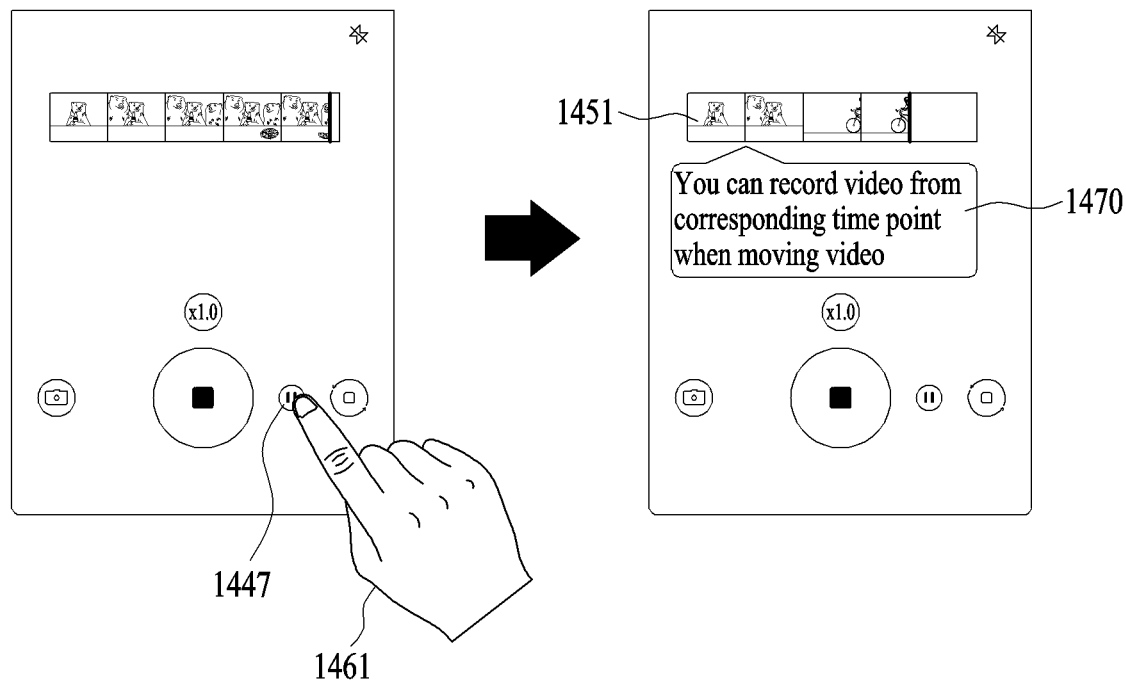
FIGS. 14A and 14B are diagrams illustrating an embodiment of outputting a guide window in a mobile terminal related to the present disclosure.
Figure 14B:
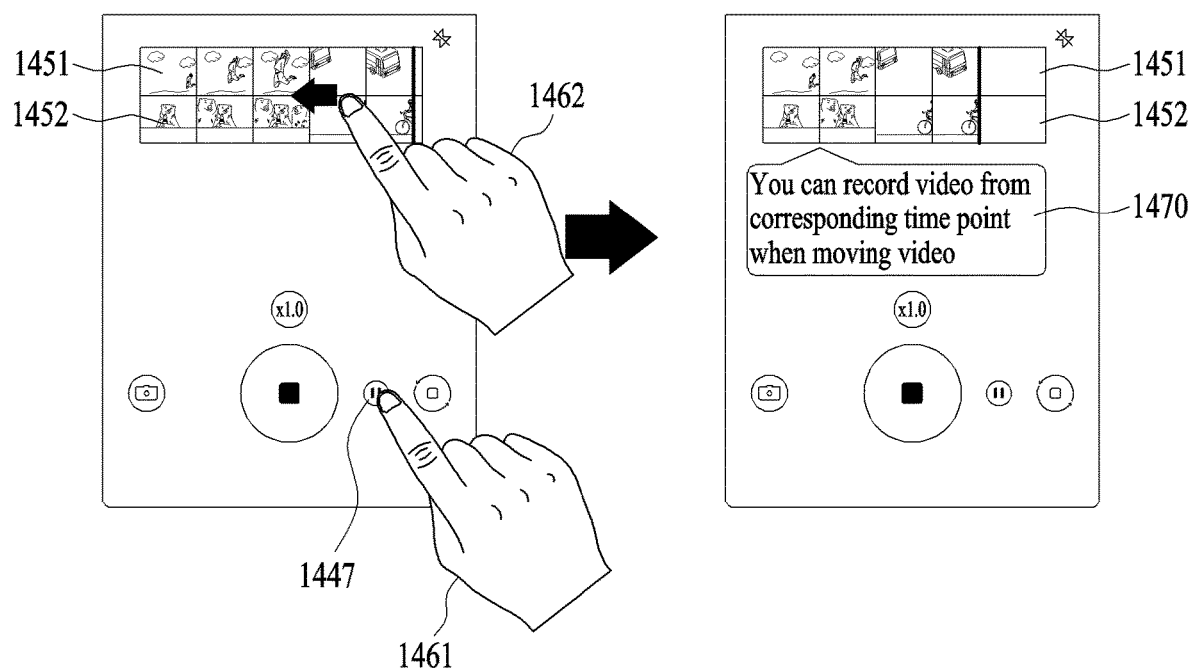

FIGS. 14A and 14B are diagrams illustrating an embodiment of outputting a guide window in a mobile terminal related to the present disclosure. FIG. 14A illustrates an embodiment of saving videos in a coupled manner and FIG. 14B illustrates an embodiment of separately saving the videos.

A first drawing of FIG. 14A may correspond to one of the second to fourth drawings of FIG. 13A. That is, the mobile terminal may receive a first signal 1461 for selecting a pause icon 1447 while saving the first video preview and the second video preview in the coupled manner.

Referring to a second drawing of FIG. 14A, in response to the first signal 1461, the mobile terminal may stop outputting thumbnails for the first video preview and the second video preview in a first frame roll 1451 and may output an editing guide pop-up window 1470.

In one embodiment of the present disclosure, the editing guide pop-up window 1470 may correspond to a pop-up window indicating a guide for indicating that recording with a new video preview is possible after the time point at which the first frame roll 1451 is paused.

A first drawing of FIG. 14B may correspond to the fourth drawing of FIG. 13B. That is, the mobile terminal may receive the first signal 1461 for selecting the pause icon 1447 while separately saving the first video preview and the second video preview.

In addition, the mobile terminal may receive a second signal 1462 for selecting thumbnails at a specific time point by dragging the first frame roll 1451 and the second frame roll 1452. For example, the user may select the thumbnails at the specific time point by touching and dragging inside the first frame roll 1451 and the second frame roll 1452.

Referring to a second drawing of FIG. 14B, the mobile terminal may stop outputting the thumbnails for the first video preview and the second video preview in the first frame roll 1451 and the second frame roll 1452 and may output the editing guide pop-up window 1470 based on the first signal 1461 or the second signal 1462.

In this regard, the editing guide pop-up window 1470 may correspond to a pop-up window indicating a guide for indicating that recording with a new video preview is possible in the first frame roll 1451 and the second frame roll 1452 from the specified time point based on the second signal 1462.

Figure 15A:
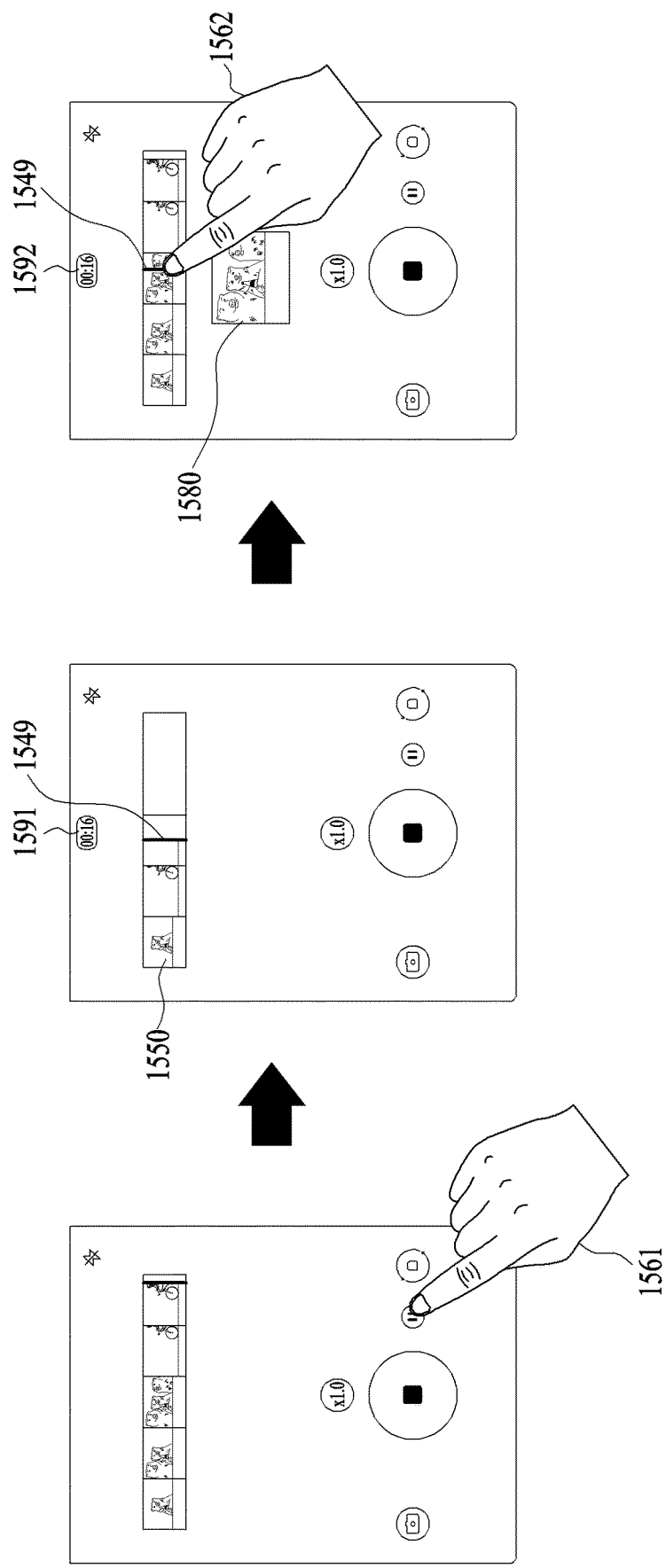
FIGS. 15A and 15B are diagrams for illustrating an embodiment of outputting a video preview for a first time point in a pop-up window in a mobile terminal related to the present disclosure.
Figure 15B:
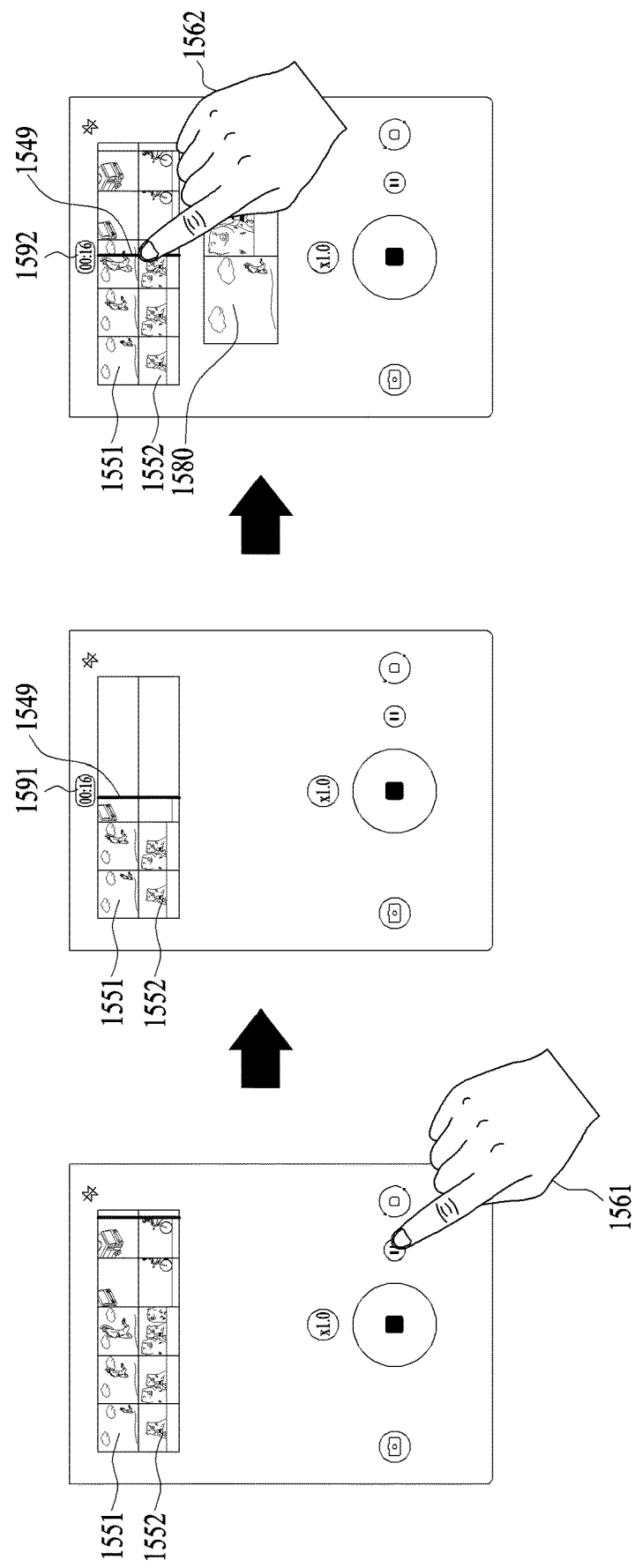

FIGS. 15A and 15B are diagrams for illustrating an embodiment of outputting a video preview for a first time point in a pop-up window in a mobile terminal related to the present disclosure. FIG. 15A illustrates an embodiment of saving videos in a coupled manner, and FIG. 15B illustrates an embodiment of separately saving videos.

Referring to a first drawing of FIG. 15A, the mobile terminal may receive a first signal 1261 for selecting a pause icon while recording a video preview.

Referring to a second drawing of FIG. 15A, the mobile terminal may move a control icon 1549 of a frame roll 1550 of the video preview to a center based on the first signal 1261. That is, when the recording is paused while recording the video preview, the mobile terminal may output the control icon 1549 output in the frame roll 1550 at a left side.

In addition, in one embodiment of the present disclosure, the mobile terminal may output a duration 1591 during which the recording is performed so far when the recording of the video preview is paused.

Referring to a third drawing of FIG. 15A, the mobile terminal may move a thumbnail being output in the frame roll 1550 in the left and right directions based on a second signal 1562 of touching the control icon 1549 and then dragging the control icon 1549 in the left and right directions.

In one embodiment of the present disclosure, the mobile terminal may output a pop-up window 1580 for a thumbnail located at the center of the frame roll 1550 on the camera application in response to the second signal 1562.

In addition, the mobile terminal may output a recording duration 1592 for the first time point selected from the frame roll 1550 in response to the second signal 1562.

FIG. 15B is a diagram illustrating the same embodiment as that in FIG. 15A. However, unlike in FIG. 15A, because video previews recorded in the first video preview and the second video preview are separately saved, two frame rolls are created.

More specifically, referring to a first drawing of FIG. 15B, the mobile terminal may output two frame rolls 1551 and 1552 as the video previews are recorded. In this regard, the mobile terminal may receive the first signal 1561 for pausing the video previews.

Referring to a second drawing of FIG. 15B, the mobile terminal may output the control icon 1549 at centers of the first frame roll 1551 and the second frame roll 1552 in response to the first signal 1561 and output the recording duration 1591 above the frame roll.

Referring to a third drawing of FIG. 15B, the mobile terminal may move thumbnails being output in the first frame roll 1551 and the second frame roll 1552 in the left and right directions in response to the second signal 1562 of touching the control icon 1549 and then dragging the control icon 1549 in the left and right directions. In this regard, the mobile terminal may output the pop-up window 1580 for thumbnails in response to the second signal 1562.

In addition, although the control icon 1549 visually output in FIGS. 15A and 15B, the mobile terminal may not output the control icon 1549, but touch and drag a portion of the frame rolls 1550, 1551, and 1552 to move the thumbnails output in the frame rolls 1550, 1551, and 1552 in the left and right directions and then output a video preview pop-up window 1580 therefor.

In this regard, because the embodiment of FIG. 15B separately saves the videos unlike the embodiment of FIG. 15A, the video preview pop-up window 1580 may also include the thumbnail for the first video preview and the thumbnail for the second video preview.

Figure 16A:
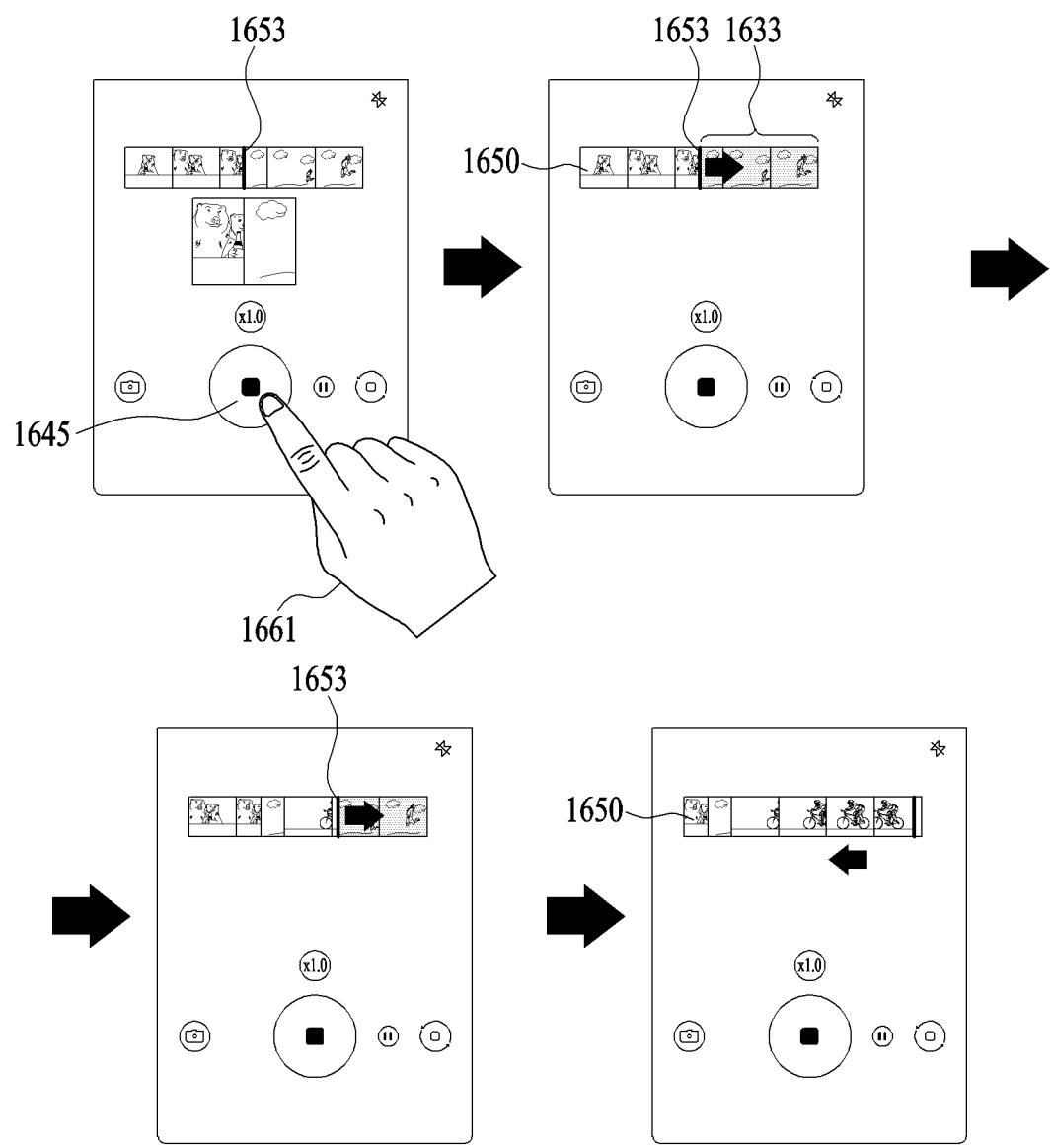
FIGS. 16A and 16B are diagrams for illustrating an embodiment of editing a video that is being recorded in a mobile terminal related to the present disclosure.
Figure 16B:
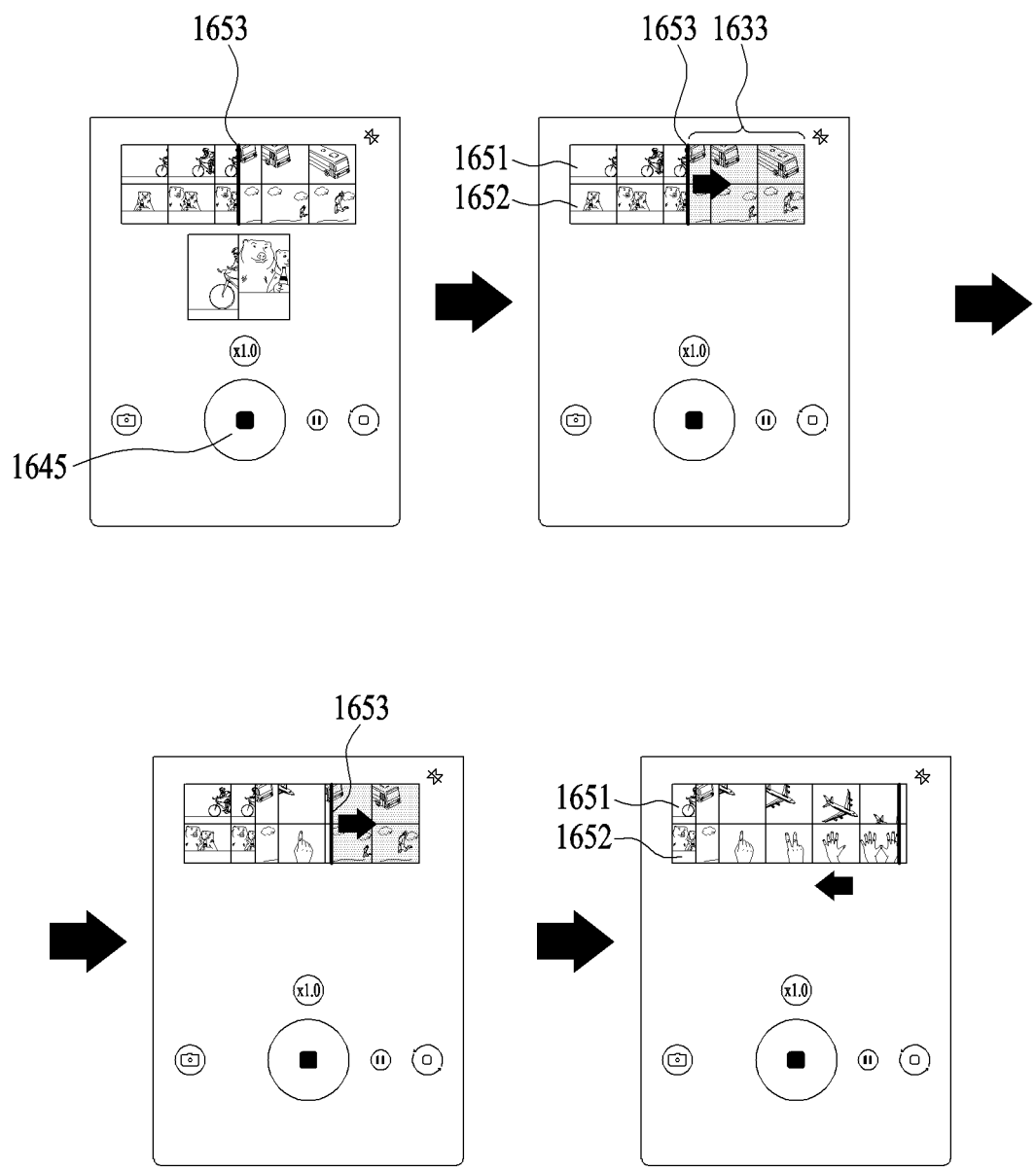

FIGS. 16A and 16B are diagrams for illustrating an embodiment of editing a video that is being recorded in a mobile terminal related to the present disclosure. FIG. 16A illustrates an embodiment of saving videos in a coupled manner, and FIB. 16B illustrates an embodiment of separately saving the videos.

A first drawing of FIG. 16A corresponds to the third drawing of FIG. 15A. That is, the mobile terminal may be in a state paused based on a first time point 1653 while recording the video preview. As described above in FIG. 15A, the mobile terminal may output a recording duration for the first time point 1653 above the frame roll and may output a thumbnail for the first time point 1653 in a pop-up window.

In one embodiment of the present disclosure, the mobile terminal may receive a first signal 1661 for selecting a recording icon 1645 in the state in which the video preview recording is paused. In this regard, the first signal 1661 is shown as the user touching the record icon 1645, but the mobile terminal may start recording via various signals of the user other than the method of touching the record icon 1645.

Referring to second and third drawings of FIG. 16A, the mobile terminal may update a frame roll 1650 with a video preview newly filmed from the first time point 1653 based on the first signal 1661.

More specifically, when the recording is restarted in the state in which the recording of the video preview is paused and the first time point 1653 inside the frame roll 1650 is selected, the mobile terminal may record the video preview newly filmed from the first time point 1653. Accordingly, a video 1633 filmed after the first time point 1653 may be edited as the newly recorded video. In this regard, the mobile terminal may add a new thumbnail to the frame roll 1650 based on the video preview newly filmed from the first time point 1653.

In one embodiment of the present disclosure, the mobile terminal may dim thumbnails 1633 of the video previously filmed in the frame roll 1650 after the first time point 1653.

Referring to a fourth drawing of FIG. 16A, the mobile terminal may update the frame roll 1650 based on a new video preview. In addition, the mobile terminal may apply the above-described embodiment to the newly edited video and the frame roll 1650. Thereafter, the mobile terminal may save or share the video whose recording is completed.

FIG. 16B is a diagram illustrating the same embodiment as that in FIG. 16A. However, unlike FIG. 16A, because the video previews recorded via the first video preview and the second video preview are separately saved, two frame rolls are created.

More specifically, a first drawing of FIG. 16B corresponds to the third drawing of FIG. 15B. That is, the mobile terminal may be in a state of being paused from the first time point 1653 while recording the video preview and separately saving the first video preview and the second video preview included in the video preview.

In one embodiment of the present disclosure, the mobile terminal may receive the signal for selecting the recording icon 1645 in the state in which the video preview recording is paused.

Referring to second and third drawings of FIG. 16B, when the video preview recording is newly started from the first time point 1653, the mobile terminal may update the frame rolls 1651 and 1652 based on the newly filmed video previews. In this regard, because the embodiment of FIG. 16B separately saves the first video preview and the second video preview unlike the embodiment of FIG. 16A, the mobile terminal may add thumbnails of the respective first video preview and second video preview to the first frame roll 1651 and the second frame roll 1652, respectively.

In addition, the mobile terminal may dim or display in black and white the thumbnails 1633 of the videos previously recorded in the first frame roll 1651 and the second frame roll 1652 after the first time point 1653.

Referring to a fourth drawing of FIG. 16B, the mobile terminal may update the first frame roll 1651 and the second frame roll 1652 based on the new video previews. Similarly, the embodiment of FIG. 16B may also be applied to the updated first frame roll 1651 and second frame roll 1652.

Figure 17:
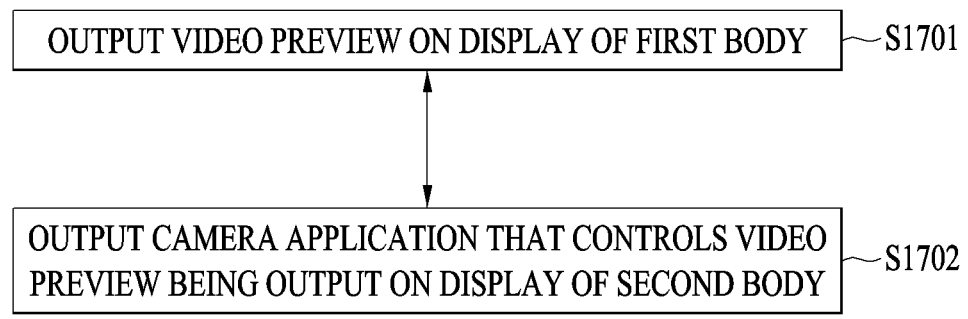
FIG. 17 is a flowchart illustrating an operation flow a mobile terminal for illustrating one embodiment of the present disclosure.

FIG. 17 is a flowchart illustrating an operation flow a mobile terminal for illustrating one embodiment of the present disclosure. Each step of FIG. 17 to be described below may be controlled by the controller in FIG. 1. In addition, the mobile terminals performing the control method in FIG. 17 may include the swivel terminal, the rollable terminal, and the foldable terminal described above. In addition, the following flowchart is a framework within the mobile terminal for understanding the above-described embodiment. The above-described embodiment may not be limited thereto, and the above-described embodiment may also be implemented in other methods.

In step S1701, the mobile terminal may output the video preview on the display of the first body. In this regard, the video preview may include the first video preview filmed by the first camera and the second video preview filmed by the second camera. In this regard, the first camera may correspond to the front camera and the second camera may correspond to the rear camera. In addition, the first camera may correspond to the rear wide-angle camera and the second camera may correspond to the rear normal camera.

In one embodiment of the present disclosure, the mobile terminal may change the output position of the first video preview and the output position of the second video preview. In addition, the mobile terminal may output the first video preview and the second video preview at the preset aspect ratio. For example, the mobile terminal may output the first video preview and the second video preview at the aspect ratio of 1:1 or the aspect ratio of 16:9. In addition, the mobile terminal may output the second video preview in the overlay scheme of the first video preview. In this regard, the size of the second video preview may be smaller than that of the first video preview.

In step S1702, the mobile terminal may output the camera application that controls the video preview being output on the display of the second body. In this regard, the mobile terminal may output the save icon for the first video preview and the second video preview on the camera application. In this regard, the save icon may include the first save icon for separately storing the first video for the first video preview and the second video for the second video preview, and the second save icon for saving the first video and the second video in the coupled manner.

In one embodiment of the present disclosure, when the first video and the second video are saved separately from each other, the mobile terminal may output the first frame roll for the first video and the second frame roll for the second video. In this regard, the first frame roll may include the thumbnail for the first video, and the second frame roll may include the thumbnail for the second video.

In another embodiment of the present disclosure, when the first video and the second video are saved in the coupled manner, the mobile terminal may output a third frame roll for the first video and the second video. In this regard, the third frame roll may include the thumbnails for the first video and the second video. That is, the third frame roll may be output in a state in which the thumbnails of the first video and the second video are coupled to each other.

In one embodiment of the present disclosure, the mobile terminal may start recording in the state of selecting the first time point inside the frame roll. Accordingly, the mobile terminal may update the frame roll with the video preview newly filmed from the first time point. In this regard, the mobile terminal may receive a selection of the first time point for one of the first frame roll to the third frame roll. In addition, when the mobile terminal receives the selection of the first time point inside the third frame roll in which the first video and the second video are saved in the coupled manner, the first video and the second video may be newly filmed together.

In one embodiment of the present disclosure, when outputting the frame roll, the mobile terminal may output thumbnails of the video at the predetermined interval. For example, the mobile terminal may output one thumbnail per second in the frame roll. In addition, when outputting the frame roll, the mobile terminal may output the thumbnail of the video in the predetermined direction. For example, the mobile terminal may add the thumbnails one by one from left to right within the frame roll.

In one embodiment of the present disclosure, when selecting the first time point in the frame roll, the mobile terminal may output the thumbnail corresponding to the first time point in the pop-up window. In addition, the mobile terminal may output the editing guide pop-up window when the video recording is paused.

In one embodiment of the present disclosure, the mobile terminal may simultaneously record the first video preview and the second video preview in response to the signal for recording the video preview, and simultaneously pause the first video preview and the second video preview in response to the pause signal. In this regard, in the state in which the first video preview and the second video preview are being recorded, the mobile terminal may stop the recording of the first video preview and dim or display in black and white the first video preview in response to the signal for selecting the first frame roll for the first video.

In one example, the embodiments described above with reference to FIGS. 9 to 16B may be implemented with the control method of the mobile terminal as shown in FIG. 17.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

INDUSTRIAL APPLICABILITY

The mobile terminal according to one embodiment of the present disclosure may be repeatedly implemented and have industrial applicability.

What is claimed is:

1. A mobile terminal comprising:
a body including a first body and a second body;
a first camera and a second camera included in the body;
a display coupled to the body so as to output an image; and
a controller,
wherein the controller is configured to output a video preview on a display of the first body, wherein the video preview includes a first video preview filmed by the first camera and a second video preview filmed by the second camera,
wherein a camera application for controlling the video preview being output is output on a display of the second body,
wherein the controller is configured to output a save icon for the first video preview and the second video preview on the camera application,
wherein the save icon includes a first save icon for separately saving a first video for the first video preview and a second video for the second video preview, and
wherein, when the first video and the second video are saved separately from each other, the controller is configured to output a first frame roll for the first video and a second frame roll for the second video on the camera application, wherein the first frame roll includes a thumbnail for the first video and the second frame roll includes a thumbnail for the second video.

2. The mobile terminal of claim 1, wherein the save icon further includes a second save icon for saving the first video and the second video in a coupled manner.

3. The mobile terminal of claim 1, wherein the controller is configured to update the first frame roll with the first video preview newly filmed from a first time point when receiving a first signal to start recording in a state the first time point in the first frame roll is selected.

4. The mobile terminal of claim 1, wherein the controller is configured to output the thumbnail for the first video and the thumbnail for the second video at a predetermined time interval.

5. The mobile terminal of claim 4, wherein the controller is configured to output the thumbnail for the first video and the thumbnail for the second video based on a predetermined direction over time when outputting the first frame roll and the second frame roll.

6. The mobile terminal of claim 1, wherein the controller is configured to output an editing guide pop-up window based on a second signal for selecting a pause icon output on the camera application.

7. The mobile terminal of claim 1, wherein the controller is configured to output a thumbnail corresponding to a first time point in a pop-up window in response to a third signal for selecting the first time point in the first frame roll.

8. The mobile terminal of claim 1, wherein the controller is configured to:
simultaneously record the first video preview and the second video preview in response to a fourth signal for recording the first video preview and the second video preview; and
simultaneously pause the recording of the first video preview and the second video preview in response to a fifth signal for pausing the recording of the first video preview and the second video preview.

9. The mobile terminal of claim 8, wherein the controller is configured to pause the recording of the first video preview and add a visual effect to the first video preview in response to a sixth signal for selecting the first frame roll in a state the first video preview is being recorded.

10. The mobile terminal of claim 1, wherein the controller is configured to:
output a switch icon on the camera application; and
change an output position of the first video preview and an output position of the second video preview in response to selecting the switch icon.

11. The mobile terminal of claim 1, wherein the controller is configured to output a ratio icon indicating an aspect ratio of the first video preview and the second video preview on the camera application.

12. The mobile terminal of claim 1, wherein the controller is configured to output the first video preview and the second video preview at an aspect ratio of 1:1.

13. The mobile terminal of claim 1, wherein the controller is configured to output the first video preview and the second video preview at an aspect ratio of 16:9, wherein the second video preview is output in a scheme of an overlay of the first video preview and a size of the second video preview is smaller than a size of the first video preview.

14. The mobile terminal of claim 1, wherein the first camera is a front camera and the second camera is a rear camera.

15. The mobile terminal of claim 1, wherein the first camera is a rear wide-angle camera and the second camera is a rear normal camera.

16. The mobile terminal of claim 1, wherein the first body is a swivel body, the second body is a main body, and the swivel body is rotatable with respect to the main body.

17. The mobile terminal of claim 1, wherein the first body and the second body are connected to each other via a hinge portion, wherein the first body and the second body overlap each other when the mobile terminal is completely folded and the first body and the second body constitute one flat surface when the mobile terminal is completely unfolded.

18. A mobile terminal comprising:
a body including a first body and a second body;
a first camera and a second camera included in the body;
a display coupled to the body so as to output an image; and
a controller,
wherein the controller is configured to output a video preview on a display of the first body, wherein the video preview includes a first video preview filmed by the first camera and a second video preview filmed by the second camera,
wherein a camera application for controlling the video preview being output is output on a display of the second body,
wherein the controller is configured to output a save icon for the first video preview and the second video preview on the camera application,
wherein the save icon includes a first save icon for saving the first video and the second video in a coupled manner, and
wherein, when the first video and the second video are saved in the coupled manner, the controller is configured to output a third frame roll for the first video and the second video on the camera application, wherein the third frame roll includes thumbnails for the first video and the second video.

19. The mobile terminal of claim 18, wherein the save icon further includes a second save icon for separately saving a first video for the first video preview and a second video for the second video preview.

20. A method for controlling a mobile terminal including a body including a first body and a second body, a first camera and a second camera included in the body, and a display coupled to the body so as to output an image, the method comprising:
outputting a video preview on a display of the first body, wherein the video preview includes a first video preview filmed by the first camera and a second video preview filmed by the second camera;
outputting a camera application for controlling the video preview being output on a display of the second body; and
outputting a save icon for the first video preview and the second video preview on the camera application,
wherein, when the first video and the second video are saved separately from each other, outputting a first frame roll for the first video and a second frame roll for the second video on the camera application, wherein the first frame roll includes a thumbnail for the first video and the second frame roll includes a thumbnail for the second video, and
wherein, when the first video and the second video are saved in the coupled manner, outputting a third frame roll for the first video and the second video on the camera application, wherein the third frame roll includes thumbnails for the first video and the second video.

* * * * *